US010735093B2

(12) United States Patent
Ono et al.

(10) Patent No.: US 10,735,093 B2
(45) Date of Patent: Aug. 4, 2020

(54) OPTICAL SPACE COMMUNICATION DEVICE AND DELAY ADJUSTMENT METHOD

(71) Applicant: NEC Corporation, Minato-ku, Tokyo (JP)

(72) Inventors: Yoshimasa Ono, Tokyo (JP); Toshiharu Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/466,702

(22) PCT Filed: Dec. 11, 2017

(86) PCT No.: PCT/JP2017/044268
§ 371 (c)(1),
(2) Date: Jun. 5, 2019

(87) PCT Pub. No.: WO2018/110472
PCT Pub. Date: Jun. 21, 2018

(65) Prior Publication Data
US 2019/0312639 A1     Oct. 10, 2019

(30) Foreign Application Priority Data
Dec. 13, 2016   (JP) ................................. 2016-240898

(51) Int. Cl.
*H04B 10/079*   (2013.01)
*H04B 10/118*   (2013.01)

(52) U.S. Cl.
CPC ....... *H04B 10/0795* (2013.01); *H04B 10/079* (2013.01); *H04B 10/118* (2013.01)

(58) Field of Classification Search
None
See application file for complete search history.

(56) References Cited

U.S. PATENT DOCUMENTS 5,777,768 A * 7/1998 Korevaar ........... H04B 10/1127
                                                         398/129
2008/0002986 A1 * 1/2008 Izumi ................. H04B 10/1121
                                                         398/158

(Continued)

FOREIGN PATENT DOCUMENTS

JP     2001-333005 A     11/2001
JP     2005-269034 A     9/2005

(Continued)

OTHER PUBLICATIONS

Sodnik et al., "Results from a Lunar Laser Communication Experiment between NASA's LADEE Satellite and ESA's Optical Ground Station", Proc. International Conference on Space Optical Systems and Applications (ICSOS) 2014, S2-1, Kobe, Japan, May 7-9, 2014, 9 pages total.

(Continued)

*Primary Examiner* — David W Lambert

(57) ABSTRACT

An optical space communication device includes first and second optical antennas that transmit first and second transmission light and receive first and second reception light, first and second delay circuits that provide a delay to transmission data included in the first and second transmission light, third and fourth delay circuits that provide a delay to reception data included in the first and second reception light, and a receiver that sets a delay of at least one of the first delay circuit and the second delay circuit and sets a delay of at least one of the third delay circuit and the fourth delay circuit, based on delays between the first and third delay circuits and the first optical antenna, delays between the second and fourth delay circuits and a fourth optical antenna, and delays between a communication destination and the third and fourth delay circuits.

20 Claims, 15 Drawing Sheets

(56) References Cited

U.S. PATENT DOCUMENTS

2016/0013882 A1* 1/2016 Hashimoto .......... H04B 10/118
398/65
2017/0207850 A1 7/2017 Takahashi et al.

FOREIGN PATENT DOCUMENTS

WO 2006/095411 A1 9/2006
WO 2016/013188 A1 1/2016

OTHER PUBLICATIONS

International Search Report dated Feb. 20, 2018 issued by the International Searching Authority in International Application No. PCT/JP2017/044268.
Written Opinion dated Feb. 20, 2018 issued by the International Searching Authority in International Application No. PCT/JP2017/044268.

* cited by examiner

OPTICAL SPACE COMMUNICATION DEVICE AND DELAY ADJUSTMENT METHOD

This application is a National Stage Entry of PCT/JP2017/044268 filed on Dec. 11, 2017, which claims priority from Japanese Patent Application 2016-240898 filed on Dec. 13, 2016, the contents of all of which are incorporated herein by reference, in their entirety.

TECHNICAL FIELD

The present invention relates to an optical space communication device and a delay adjustment method, more particularly, to an optical space communication device including a plurality of optical antennas and a delay adjustment method used by the optical space communication device.

BACKGROUND ART

A demand for transmission of high-definition data acquired by an observation satellite to the ground is increasing due to development of a remote sensing technology. Further, a communication service via a satellite is also proposed, and a communication capacity needed between the ground and a satellite is expected to increase in the future. A microwave is currently used as a communication means between the ground and a satellite. However, a communication capacity by a microwave is limited due to tightness of a radio band and a restriction on transmission speed.

Optical space communication is known as a technique capable of dealing with such an increase in transmission capacity. The optical space communication is a technique for communicating by propagating signal light used in optical fiber communication through free space instead of the inside of an optical fiber, and is able to acquire a communication capacity equivalent to that of the optical fiber communication from an idealistic viewpoint. Furthermore, the optical space communication is able to suppress spatial spread of signal light further than that of a microwave, by using signal light having a wavelength in a near-infrared region. Thus, the optical space communication is able to increase the density of a transmission path, which can also increase a communicable data capacity. Further, since signal light has high directivity, an improvement of communication confidentiality is also expected by using the optical space communication.

However, the optical space communication has the following problem as compared to the optical fiber communication. The problem is that a change in traveling direction and spatial pattern of propagating light due to fluctuations in refractive index of the atmosphere of the earth's surface by a temperature change, wind, and the like results in deterioration of communication quality or random fluctuations thereof. For example, when uplink communication from the ground to a satellite is considered, atmospheric fluctuation near a transmitter on the ground may cause a traveling direction of transmitted signal light (transmission light) to make a turn to a random direction, and reception intensity of signal light received by a satellite may greatly fluctuate.

As one of methods of reducing such fluctuations in reception intensity, PTL 1 describes a configuration in which a communication facility on the ground includes a plurality of transmission telescopes. In the configuration described in PTL 1, the plurality of transmission telescopes are spatially disposed away from each other, and thus each signal light transmitted from each of the transmission telescopes is affected by different atmospheric fluctuation. As a result, a probability of incidence of signal light on a reception telescope of a satellite can be increased. Further, a sum of intensity of signal light transmitted from the ground side is increased by increasing the number of transmission telescopes. As a result, reception intensity of signal light of the satellite can be maintained to be high.

Note that an antenna that transmits and receives signal light may be referred to as an "optical antenna" or a "telescope" in the optical space communication. Further, an antenna that transmits signal light may be referred to as a "transmission telescope", and an antenna that receives signal light may be referred to as a "reception telescope".

A problem when a plurality of transmission telescopes are used is a delay adjustment between a plurality of beams of transmission lights. Since each transmission light is emitted from an opening of a different transmission telescope one another, a delay due to a difference in optical path length from a modulator inside a transmission device to an emission position occurs. Thus, reception timing of transmission data may vary by each transmission light when the transmission light is received by a satellite, and, in this case, communication quality deteriorates. For such a problem, NPL 1 describes that a delay difference between beams of transmission lights between a transmission telescope and a satellite is eliminated by fixing a plurality of transmission telescopes to a frame. Furthermore, NPL 1 describes that a delay difference between a modulator and a transmission telescope is reduced by measuring a delay amount of light transmission from the modulator to the transmission telescope and adjusting a length of a coaxial cable that transmits modulation information.

Furthermore, PTL 2 describes a delay time measurement method of acquiring, by performing loopback on data transmitted from a radio base station device to a radio transmission/reception device, delay time between both of the devices. PTL 3 describes a configuration in which diversity synthesis is performed on a reception signal by using a plurality of optical receivers.

CITATION LIST

Patent Literature

[PTL 1] U.S. Pat. No. 5,777,768
[PTL 2] Japanese Unexamined Patent Application Publication No. 2005-269034
[PTL 3] Japanese Unexamined Patent Application Publication No. 2001-333005

Non Patent Literature

[NPL 1] Z. Sodnik et al. "Results from a Lunar Laser Communication Experiment between NASA's LADEE Satellite and ESA's Optical Ground Station", Proc. International Conference on Space Optical Systems and Applications (ICSOS), 2014

SUMMARY OF INVENTION

Technical Problem

Problems of the delay adjustment method described in NPL 1 described above are described.

A first problem is that only a fixed action based on a delay measured before communication starts can be performed.

For example, when a delay amount changes during communication due to a change in distance to a communication destination and the like, the technique described in NPL 1 is not effective.

A second problem is that a difference in optical path length in an optical system inside a telescope is not considered. Transmission speed used in the technique described in NPL 1 is approximately 20 Mbps, and a bit length in space is approximately 1.5 m. When a bit length is relatively long in such a manner, a problem of an optical path length is negligible. However, since an increase in transmission speed shortens a bit length, accuracy of optical alignment required for a telescope is increased, and the accuracy affects communication quality.

Then, PTLs 1 to 3 do not disclose a means for solving the above-described problems in an optical space communication device in which a plurality of transmission telescopes are used.

OBJECT OF INVENTION

An object of the present invention is to provide an optical space communication device and a delay adjustment method being capable of reflecting a delay amount of an optical system of a telescope and dealing with a change in delay amount during communication.

Solution to Problem

An optical space communication device of the present invention includes:

a first optical antenna that transmits first transmission light including transmission data to a communication destination, and receives first reception light including reception data from the communication destination;

a second optical antenna that transmits second transmission light including the transmission data to the communication destination, and receives second reception light including the reception data from the communication destination;

a first delay means for providing a predetermined delay to the transmission data included in the first transmission light;

a second delay means for providing a predetermined delay to the transmission data included in the second transmission light;

a third delay means for providing a predetermined delay to the reception data included in the first reception light;

a fourth delay means for providing a predetermined delay to the reception data included in the second reception light; and a reception means for
receiving the reception data included in the first reception light and the reception data included in the second reception light,
acquiring a first time difference being a difference between a first delay amount being a delay between the first delay means and the first optical antenna and a second delay amount being a delay between the second delay means and the second optical antenna,
acquiring a second time difference being a difference between a third delay amount being a delay between the first optical antenna and the third delay means and a fourth delay amount being a delay between the second optical antenna and the fourth delay means,
acquiring a third time difference being a difference between a third delay amount being a delay between the communication destination and the third delay means and a fourth delay amount being a delay between the communication destination and the fourth delay means,
setting a delay of at least one of the first delay means and the second delay means in such a way that the transmission data included in the first transmission light and the transmission data included in the second transmission light are received at the communication destination at approximately the same timing, based on the first to third time differences, and
setting a delay of at least one of the third delay means and the fourth delay means in such a way that all the reception data are received at approximately the same timing, based on the third time difference.

A delay adjustment method of the present invention includes:

transmitting first transmission light including transmission data to a communication destination from a first optical antenna;

receiving first reception light including reception data from the communication destination in a second optical antenna;

transmitting second transmission light including the transmission data to the communication destination;

receiving second reception light including the reception data from the communication destination;

providing a predetermined delay to the transmission data included in the first transmission light, by a first delay means;

providing a predetermined delay to the transmission data included in the second transmission light, by a second delay means;

providing a predetermined delay to the reception data included in the first reception light, by a third delay means;

providing a predetermined delay to the reception data included in the second reception light, by a fourth delay means;

by a receiver,
receiving the reception data included in the first reception light and the reception data included in the second reception light;
acquiring a first time difference being a difference between a first delay amount being a delay between the first delay means and the first optical antenna and a second delay amount being a delay between the second delay means and the second optical antenna;
acquiring a second time difference being a difference between a third delay amount being a delay between the first optical antenna and the third delay means and a fourth delay amount being a delay between the second optical antenna and the fourth delay means;
acquiring a third time difference being a difference between a third delay amount being a delay between the communication destination and the third delay means and a fourth delay amount being a delay between the communication destination and the fourth delay means;
setting a delay of at least one of the first delay means and the second delay means in such a way that the transmission data included in the first transmission light and the transmission data included in the second transmission light are received at the communication destination at approximately the same timing, based on the first to third time differences; and
setting a delay of at least one of the third delay means and the fourth delay means in such a way that all the reception data are received at approximately the same timing, based on the third time difference.

Advantageous Effects of Invention

An optical space communication device and a delay adjustment method of the present invention is able to reflect a delay amount of an optical system of a telescope and deal with a change in delay amount during communication.

EXAMPLE EMBODIMENT

Example embodiments of the present invention will be described below in detail. An arrow provided in a block diagram indicates an example of a direction of a signal, and does not limit a direction of the signal.

First Example Embodiment

Figure 1:
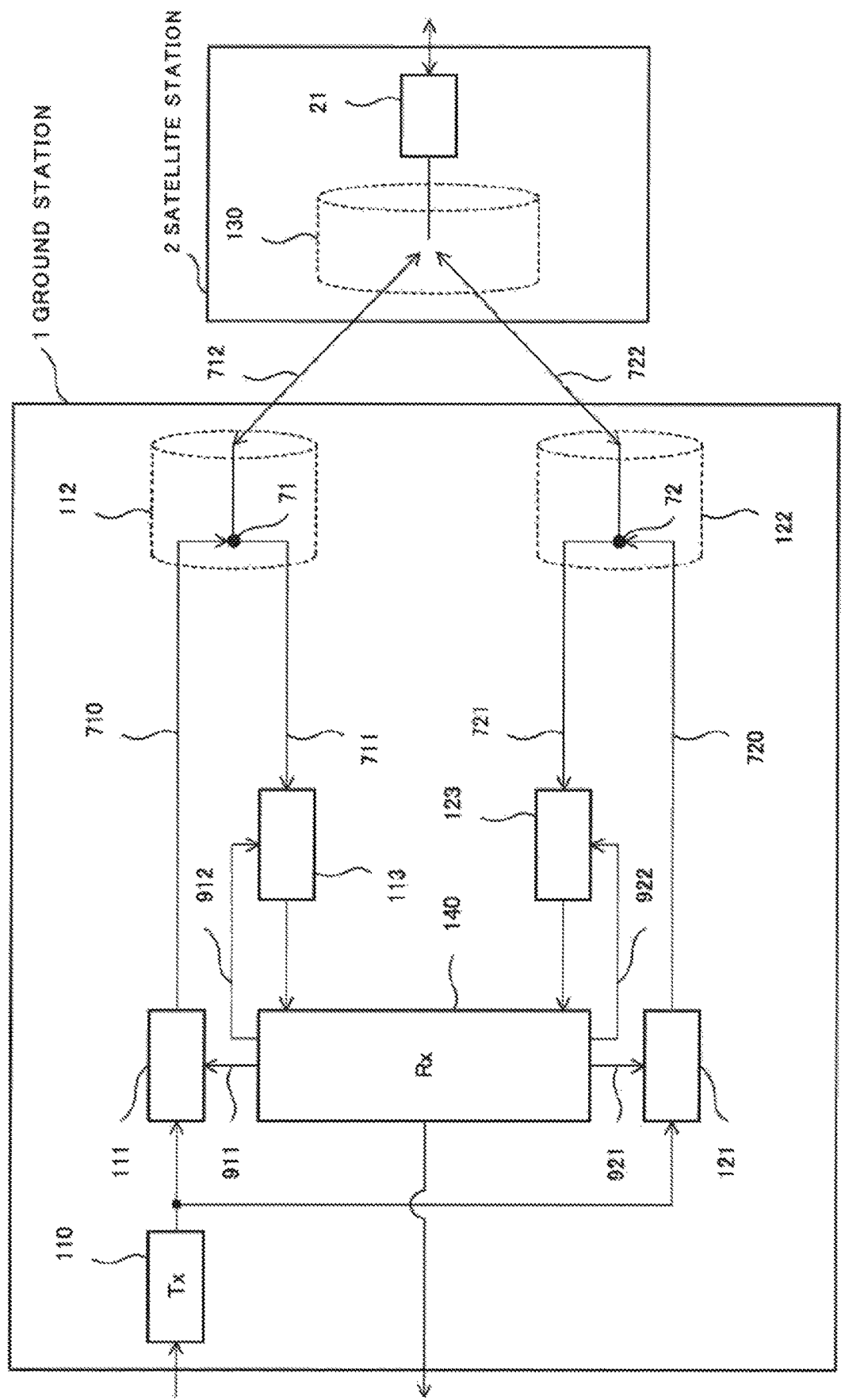
FIG. 1 is a block diagram illustrating a configuration example of an optical space communication system 100 according to a first example embodiment.

FIG. 1 is a block diagram illustrating a configuration example of an optical space communication system 100 according to a first example embodiment of the present invention. The optical space communication system 100 includes a ground station 1 and a satellite station 2. The ground station 1 and the satellite station 2 perform optical space communication via free space. The ground station 1 is a communication device installed on the ground, and includes a transmitter (Tx) 110, a receiver (Rx) 140, delay circuits 111, 113, 121, and 123, and optical antennas 112 and 122.

The transmitter 110 generates data (hereinafter, referred to as "transmission data") transmitted from the ground station 1 to the satellite station 2 and outputs the data. The transmission data may be generated based on a signal input from the outside of the transmitter 110. The transmission data output from the transmitter 110 are divided into two and input to the delay circuits 111 and 121 at the same timing.

The delay circuits 111 and 121 provide a predetermined delay amount (hereinafter, a delay amount is simply described as a "delay") to the transmission data, and output the transmission data as signal light (hereinafter, referred to as "transmission light") transmitted from the optical antennas 112 and 122. In other words, the delay circuits 111 and 121 adjust timing of the transmission data included in the transmission light. Each delay in the delay circuits 111 and 121 is set by the receiver 140.

A transmission path 710 connects the delay circuit 111 to the optical antenna 112. A transmission path 720 connects the delay circuit 121 to the optical antenna 122. A manner of a signal and a transmission medium between the delay circuits 111 and 121 and the optical antennas 112 and 122 are not limited.

The transmission light output from the delay circuit 111 is transmitted to the satellite station 2 via the transmission path 710 and an intersection 71 inside the optical antenna 112. The transmission light output from the delay circuit 121 is transmitted to the satellite station 2 via the transmission path 720 and an intersection 72 inside the optical antenna 122.

The optical antennas 112 and 122 are optical antennas having directivity. The optical antennas 112 and 122 face an optical antenna 130 provided in the satellite station 2 in such a way as to be able to perform optical space communication with the optical antenna 130. The optical antennas 112 and 122 are able to control a direction of signal light being transmitted and received. A basic configuration for controlling a direction of an antenna is well known, and thus detailed description is omitted. The transmission light is transmitted from the optical antennas 112 and 122 to the optical antenna 130 of the satellite station 2. FIG. 1 illustrates an example of a path through which the transmission light passes from the optical antennas 112 and 122 to the optical antenna 130 by transmission paths 712 and 722.

In the present example embodiment, the satellite station 2 is a communication device installed on an artificial satellite such as a geostationary satellite and a quasi-zenith satellite, but an installation manner of the satellite station 2 is not limited. The satellite station 2 may be installed on a general flying object such as an aircraft, and may be installed on a mobile object on the ground or a building fixed to the ground.

The satellite station 2 includes the optical antenna 130 and a transmitter-receiver 21. The optical antenna 130 is an optical antenna having directivity, and faces the optical antennas 112 and 122 provided in the ground station 1 in such a way as to be able to perform optical space communication with the optical antennas 112 and 122. The optical antenna 130 receives the transmission lights from the optical antennas 112 and 122, and inputs a signal thereof to the transmitter-receiver 21. The transmitter-receiver 21 processes the transmission light received by the optical antenna 130, and also generates signal light (hereinafter, referred to as "reception light") transmitted from the satellite station 2 to the ground station 1. The transmitter-receiver 21 is an optical transceiver including a function of interfacing between the transmission light and the reception light, and the outside of the satellite station 2. The reception light generated by the transmitter-receiver 21 is transmitted from the optical antenna 130 to the ground station 1 and received by the optical antennas 112 and 122. The optical antennas 112, 122, and 130 are also referred to as telescopes.

A beam of the signal light transmitted from the optical antenna 130 of the satellite station 2 spreads by space propagation, and is incident on the optical antennas 112 and 122. FIG. 1 illustrates an example of a path through which the reception light passes from the optical antenna 130 to the optical antennas 112 and 122 by the transmission paths 712 and 722, similarly to the path from the ground station 1 to the satellite station 2. The reception light incident on the optical antenna 112 of the ground station 1 is input to the delay circuit 113 through a transmission path 711 from the intersection 71. The reception light incident on the optical antenna 122 is input to the delay circuit 123 through a transmission path 721 from the intersection 72.

The delay circuits 113 and 123 extract reception data included in the reception light being input, provide a predetermined delay to the reception data, and then output the reception data to the receiver 140. In other words, the delay circuits 113 and 123 adjust timing of the reception data in the receiver. Delays of the delay circuits 113 and 123 are set by the receiver 140. The reception data output from the delay circuits 113 and 123 are subjected to signal processing in the receiver 140. The receiver 140 may output the reception data subjected to the signal processing to the outside of the ground station 1.

In the ground station 1 having the configuration above, the transmission paths 710 and 720 may not necessarily have the same optical length. The same is applied to the transmission paths 711 and 721, and the transmission paths 712 and 722. For example, when the optical antennas 112 and 122 are installed at places away from the transmitter 110 and the receiver 140, transmission paths between them may not have the same length. Thus, a delay of the transmission paths needs to be adjusted in such a way that transmission data included in each transmission light transmitted from the optical antennas 112 and 122 to the satellite station 2 are received by the transmitter-receiver 21 of the satellite station 2 at the same timing.

Further, delays of the transmission paths need to be adjusted in such a way that reception data included in reception light received by each of the optical antennas 112 and 122 are received by the receiver 140 of the ground station 1 at the same timing. The delay circuits 111, 113, 121, and 123 provide a delay to input data in such a way that transmission data and reception data are received at suitable timing.

Next, a delay adjustment method according to the present example embodiment is described. Note that, in the following description of each example embodiment, it is assumed that a distance in each section from the transmitter 110 to the delay circuits 111 and 121 is short, and a difference in delay of transmission data from the transmitter 110 to the delay circuits 111 and 121 is negligible. Further, it is also assumed that a difference in delay of reception data in each section from the delay circuits 113 and 123 to the receiver 140 is negligible.

Figure 2:
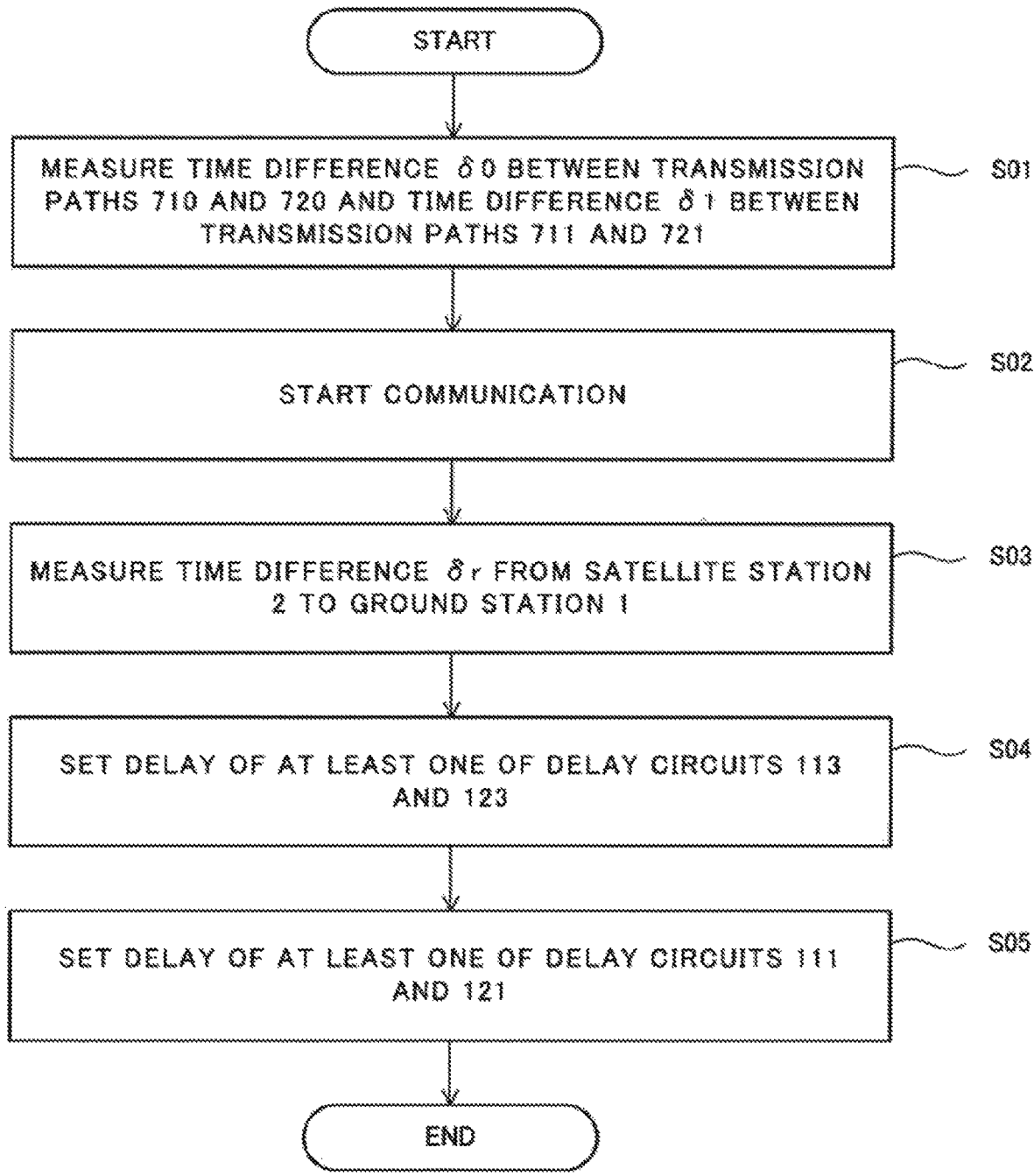
FIG. 2 is a flowchart illustrating an example of a delay adjustment method according to the first example embodiment.

FIG. 2 is a flowchart illustrating an example of the delay adjustment method according to the first example embodiment. Before communication between the ground station 1 and the satellite station 2 starts, a difference (time difference $\delta 0$) between a delay of the transmission path 710 and a delay of the transmission path 720 and a difference (time difference $\delta 1$) between a delay of the transmission path 711 and a delay of the transmission path 721 are measured (Step S01 in FIG. 2). Herein, a delay of a transmission path represents a time needed for propagation of a signal through the transmission path. In the present example embodiment, a method of measuring a delay of a transmission path is not limited. For example, a time from transmission of a signal from one end of a transmission path to be measured until reception of the signal at the other end may be taken as a delay of the transmission path. In the present example embodiment, a case where the delay of the transmission path 720 is greater than the delay of the transmission path 710 by $\delta 0$, and the delay of the transmission path 721 is greater than the delay of the transmission path 711 by $\delta 1$ is described.

When the communication between the ground station 1 and the satellite station 2 starts (Step S02), a time difference $\delta r$ between the paths from the transmitter-receiver 21 of the satellite station 2 to the receiver 140 of the ground station 1 is measured (Step S03). In the present example embodiment, a case where the delay of the path (via the optical antenna 122) via the transmission path 722 and the transmission path 721 is longer than the delay of the path (via the optical antenna 112) via the transmission path 712 and the transmission path 711 by the time difference $\delta r$ is described.

The receiver 140 sets a delay of at least one of the delay circuits 113 and 123 by using control lines 912 and 922 in such a way that reception timing of reception data in the receiver 140 is the same (Step S04). As described above, when the delay via the optical antenna 122 in the transmission path of the reception data is greater than the delay via the optical antenna 112 by the time difference $\delta r$, the receiver 140 reduces the delay of the delay circuit 123 further than that of the delay circuit 113 by $\delta r$ from the delay at the time of measurement before the communication starts. Alternatively, the receiver 140 increases the delay of the delay circuit 113 further than that of the delay circuit 123 by $\delta r$.

Next, a delay of a signal to be transmitted from the ground station 1 is set. In other words, the receiver 140 sets a delay of at least one of the delay circuits 111 and 121 via control lines 911 and 921 (Step S05). For example, the receiver 140 increases the delay of the delay circuit 111 further than that of the delay circuit 121 by $\delta r - \delta 1 + \delta 0$ compared to the delay with that before the execution of Step S01. In this way, transmission data included in transmission light via the optical antenna 112 and transmission data included in transmission light via the optical antenna 122 are received by the satellite station 2 at the same time.

In such a manner, the receiver 140 controls delays of the delay circuits 111, 113, 121, and 123 by using the control lines 911, 912, 921, and 922 in the present example embodiment. At this time, a delay of reception light during communication and a delay of a transmission path measured before the communication are used.

The optical space communication system 100 according to the present example embodiment can easily make a delay adjustment in which a delay of a transmission path including an optical system through which transmission data and reception data pass is reflected. Further, delays of the delay circuits 111, 113, 121, and 123 are set based on a delay of reception light, and thus a more accurate delay can be set based on a delay during communication. In other words, the optical space communication system 100 is able to reflect a delay amount of an optical system of an optical antenna and deal with a change in delay amount during communication. Furthermore, a delay measurement is performed by a function of the ground station 1, and thus the satellite station 2 does not need a special function for the delay adjustment.

Second Example Embodiment

Figure 3:
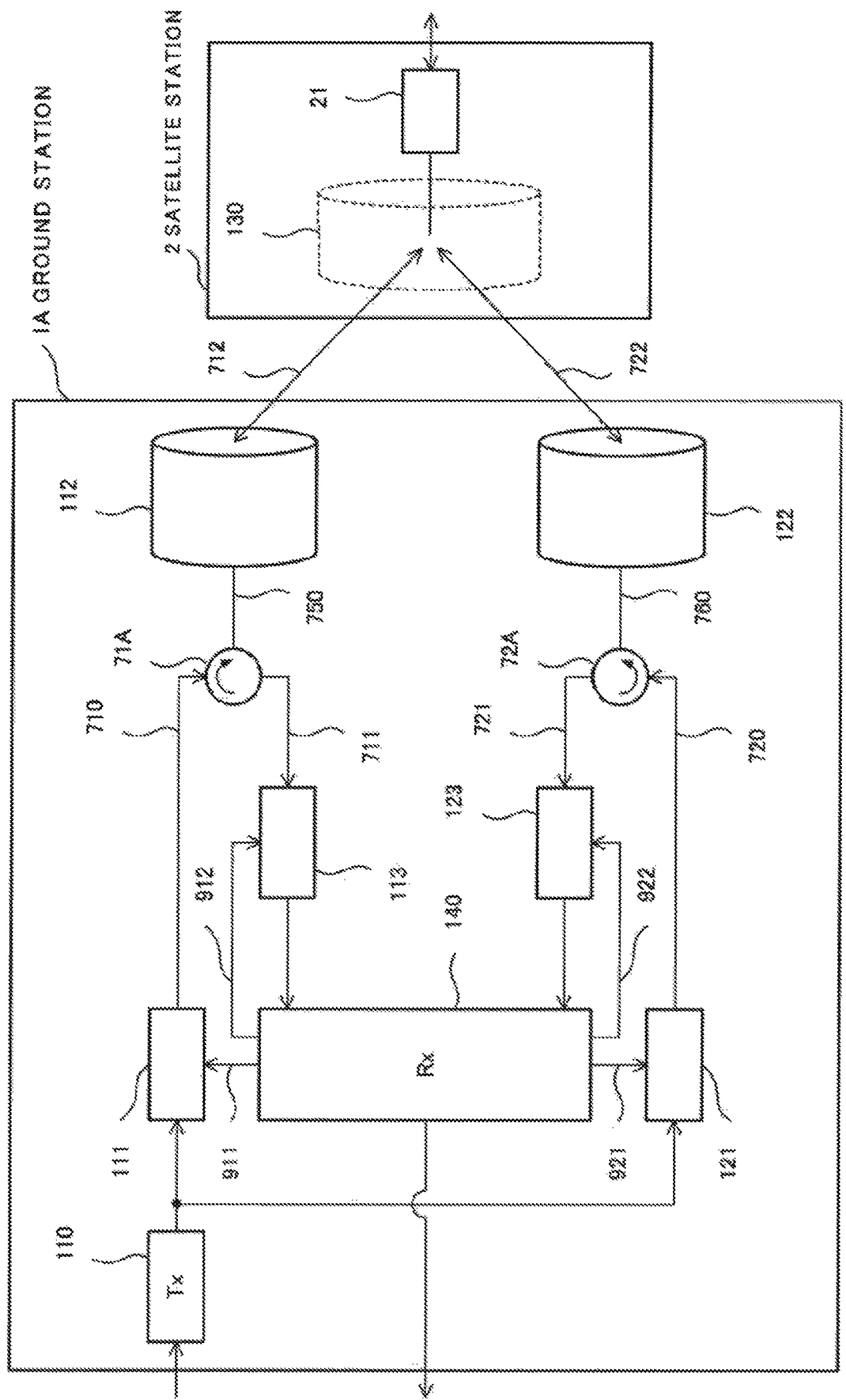
FIG. 3 is a block diagram illustrating a configuration example of an optical space communication system 200 according to a second example embodiment.

Next, a second example embodiment of the present invention is described. FIG. 3 is a block diagram illustrating a configuration example of an optical space communication system 200 according to the present example embodiment. A component that has already been described is provided with the same reference sign in FIG. 3 and the following drawings, and the description thereof is not repeated.

The optical space communication system 200 includes a ground station 1A and a satellite station 2. A configuration of the ground station 1A is mostly the same as that of the ground station 1 in the first example embodiment, but the ground station 1A includes circulators 71A and 72A instead of the intersections 71 and 72 of the ground station 1. The circulators 71A and 72A may be located either inside or outside of optical antennas 112 and 122. Further, a 1×2 optical directional coupler (namely, an optical coupler) may be used instead of an optical circulator. Furthermore, when transmission light and reception light have different wavelengths, an optical multiplexer-demultiplexer may be used instead of an optical circulator.

In the present example embodiment, transmission data output from a transmitter 110 is an electric signal. Delay circuits 111 and 121 include a function of providing a delay to an electric signal and an electric-optic conversion function. These functions are achieved by using an electric circuit and a light emitting element. The delay circuit 111 converts transmission data provided with a delay into transmission light, and sends the transmission light to a transmission path 710. The transmission data may be a signal for driving a light emitting element. Examples of the light emitting element include a semiconductor laser diode. Similarly, the delay circuit 121 also includes the function of providing a delay to an electric signal and the electric-optic conversion function, converts transmission data provided with a delay into transmission light, and sends the transmission light to a transmission path 720.

Further, reception data input to a receiver 140 are an electric signal in the present example embodiment. Delay circuits 113 and 123 include an optic-electric conversion function and a function of providing a delay to an electric signal. These functions are achieved by using a light receiving element and an electric circuit. Reception light is converted into an electric signal in the light receiving element. Examples of the light receiving element include a semiconductor photodiode. The delay circuits 113 and 123 provide a delay to the electric signal converted from the reception light, and send the electric signal to the receiver 140.

Furthermore, transmission paths 710, 711, 720, 721, 750, and 760 are optical fibers in the present example embodiment. The circulators 71A and 72A have a structure that can be optically coupled to these transmission paths. An optical waveguide or another optical transmission medium may be used as these transmission paths.

The circulator 71A inputs transmission light input from the transmission path 710 to the optical antenna 112 via the transmission path 750, and also outputs reception light input from the transmission path 750 to the transmission path 711. The circulator 72A inputs transmission light input from the transmission path 720 to the optical antenna 122 via the transmission path 760, and also outputs reception light input from the transmission path 760 to the transmission path 721.

The optical antenna 112 performs conversion on a transmission medium between the transmission path 750 (an optical fiber) and the transmission path 712 (space). The optical antenna 112 may include an optical fiber collimator connected to the transmission path 750 with an optical fiber. The optical fiber collimator radiates transmission light propagating through the transmission path 750 to the transmission path 712, and inputs reception light received from the transmission path 712 to the transmission path 750. The optical antenna 122 is also able to perform conversion on a transmission medium between the transmission path 760 (an optical fiber) and the transmission path 722 (space) by using an optical fiber collimator.

Next, a delay adjustment method according to the present example embodiment is described. In the delay adjustment method according to the present example embodiment, a difference (time difference δ0) between a delay of the transmission path 710 and a delay of the transmission path 720 and a difference (time difference δ1) between a delay of the transmission path 711 and a delay of the transmission path 721 are measured, similarly to the first example embodiment (Step S01 in FIG. 2). Specifically, a connection between the transmission path 710 and the circulator 71A, and a connection between the transmission path 720 and the circulator 72A, are disconnected. Then, the delay circuits 111 and 121 are caused to output a test signal. After that, the time difference δ0 can be measured by measuring a difference in arrival time between a test signal that propagates through the transmission path 710 and is output to a connection point with the circulator 71A, and a test signal that propagates through the transmission path 720 and is output to a connection point with the circulator 72A.

Further, the connection between the transmission path 711 and the circulator 71A and the connection between the transmission path 721 and the circulator 72A are disconnected, and the test signals are input from the connection points of the circulators 71A and 72A to the transmission paths 711 and 721 at the same timing. Then, a difference in delay time between the transmission paths 711 and 721 can be measured by measuring a difference in arrival time between these test signals by the receiver 140. However, a procedure for measuring the time differences δ0 and δ1 is not limited to that described above.

A procedure after communication starts between the ground station 1A and the satellite station 2 is similar to that in the first example embodiment (Steps S03 to S05 in FIG. 2). In other words, the receiver 140 acquires a time difference δr between paths from a transmitter-receiver 21 to the receiver 140, and increases a delay of the delay circuit 113 further than that of the delay circuit 123 by δr and also increases a delay of the delay circuit 111 further than that of the delay circuit 121 by δr−δ1+δ0. By setting the delays of the delay circuits 111, 113, 121, and 123 in such a manner, respective reception timings of transmission data and reception data passing through the optical antennas 112 and 122 can coincide with each other.

The optical space communication system 200 according to the second example embodiment uses an optical fiber component (the circulators 71A and 72A) that are easy to handle at an optical branching portion of transmission light and reception light. Thus, the optical space communication system 200 is able to easily measure a difference in delay between transmission paths without affecting an optical space transmission system between the ground station 1A and the satellite station 2 in addition to the effect of the first example embodiment.

Note that, in the ground station 1A in the present example embodiment, the delay circuits 111 and 121 include the electric-optic conversion function, and the delay circuits 113 and 123 include the optic-electric conversion function. However, the electric-optic conversion function and the optic-electric conversion function may be included as independent circuits outside these delay circuits. The electric-optic conversion function and the optic-electric conversion function may be disposed as circuits between the optical antennas 112 and 122 and the receiver 140. Further, each delay circuit in the present example embodiment provides a delay to an electric signal. However, each delay circuit may include a function of providing a delay to transmission light or reception light.

Third Example Embodiment

Figure 4:
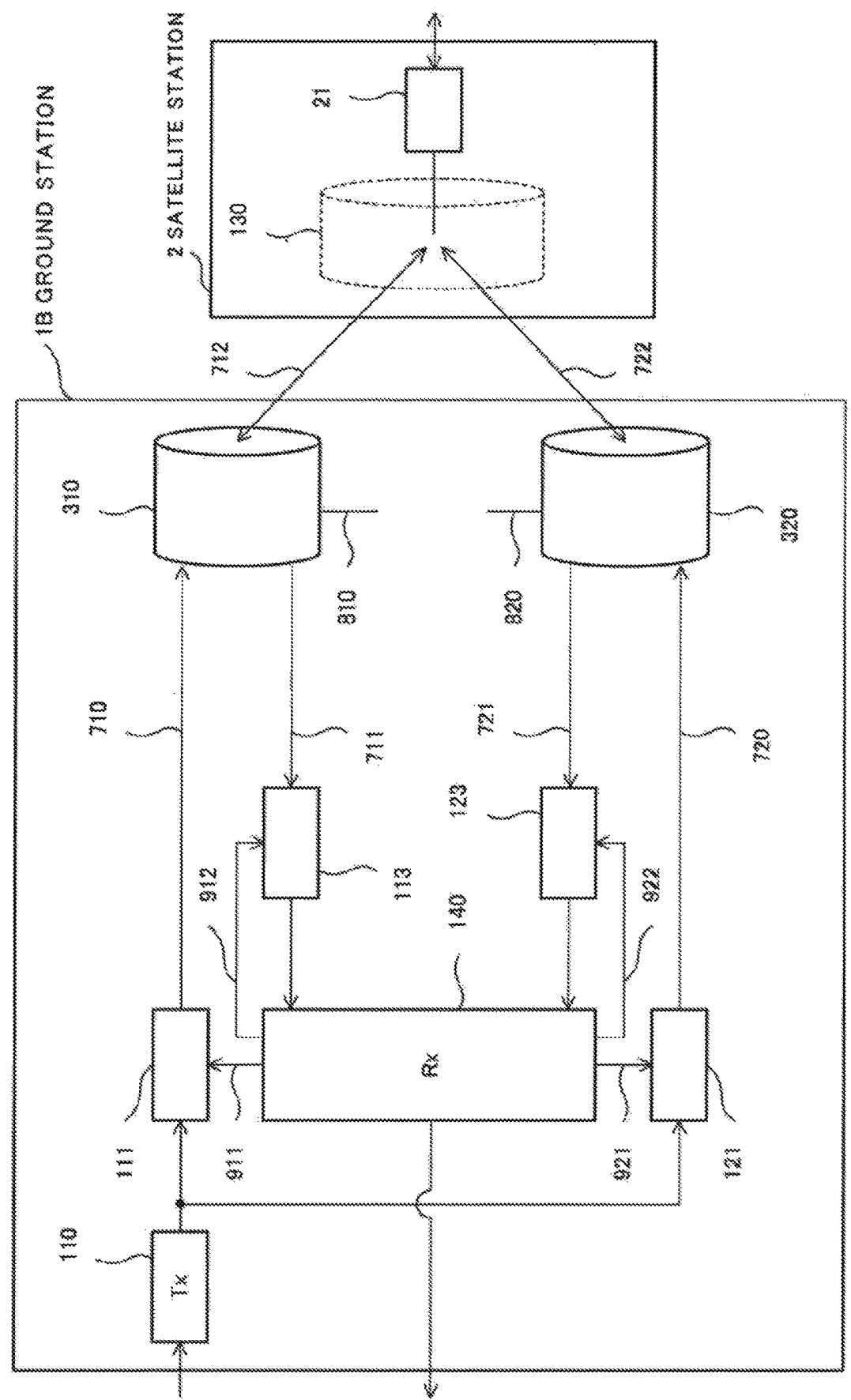
FIG. 4 is a block diagram illustrating a configuration example of an optical space communication system 300 according to a third example embodiment.

Next, a third example embodiment of the present invention is described. FIG. 4 is a block diagram illustrating a configuration of an optical space communication system 300 according to the present example embodiment. The optical space communication system 300 includes a ground station 1B and a satellite station 2. As compared to the ground station 1A in the second example embodiment, the ground station 1B includes optical antennas 310 and 320 instead of the optical antennas 112 and 122. The ground station 1B is different from the ground station 1A in the second example embodiment in that the ground station 1B includes a configuration that separates transmission light and reception light by using a space optical system.

Figure 5:
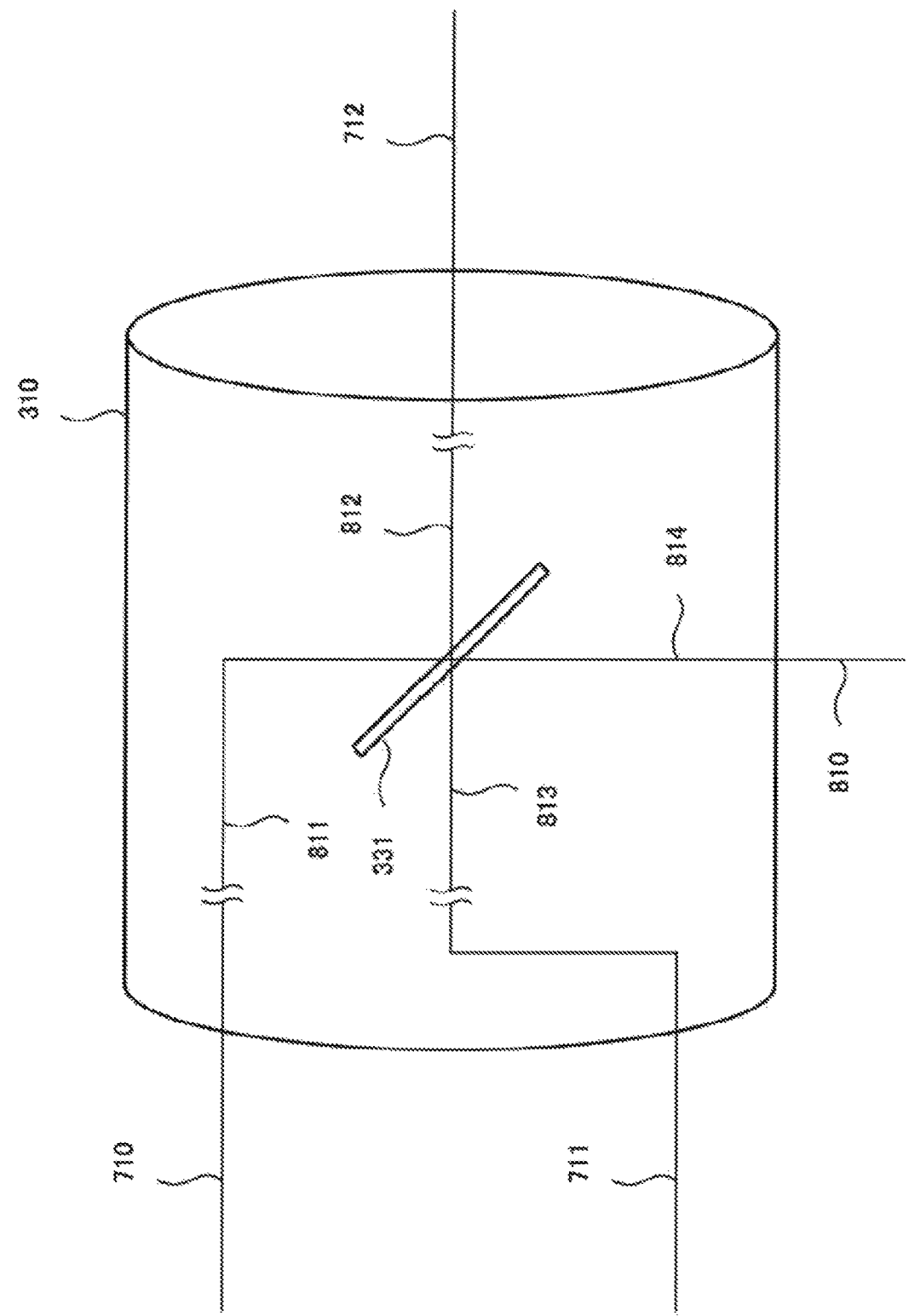
FIG. 5 is a diagram illustrating a connection example of a transmission path between the inside and the outside of an optical antenna 310.

FIG. 5 is a diagram illustrating a connection example of a transmission path between the inside and the outside of the optical antenna 310. The optical antenna 310 includes a separator 331 that separates transmission light and reception light. The separator 331 corresponds to the intersection 71 in FIG. 1. Propagation paths of transmission light and reception light inside the optical antenna 310 are indicated by transmission paths 811, 812, 813, and 814. The transmission paths 811, 812, 813, and 814 are space transmission paths. An ellipsis indicated on the way of the transmission paths 811, 812, and 813 in the optical antenna 310 indicates that a function of controlling propagating light individually may be included on the transmission paths.

The separator 331 reflects transmission light input from the transmission path 811 and allows penetration of reception light input from the transmission path 812. The transmission light propagates through the transmission path 710, the transmission path 811, the transmission path 812, and the transmission path 712 in this order. The reception light propagates through the transmission path 712, the transmission path 812, the transmission path 813, and the transmission path 711 in this order. The transmission path 712 is a transmission path between the ground station 1B and the satellite station 2. In FIG. 5, the separator 331 reflects transmission light and allows penetration of reception light. The transmission path 814 is a transmission path of monitor light, and is connected to a transmission path 810 outside.

The separator 331 is, for example, a dichroic mirror or a polarizing beam splitter (PBS). The dichroic mirror reflects incident light or allows penetration of incident light depending on a wavelength of the incident light. The PBS reflects incident light or allows penetration of incident light depending on a polarization direction of the incident light. By using the properties thereof, the separator 331 controls a transmission direction of light depending on a difference in a wavelength or polarization of transmission light and reception light. The transmission light and the reception light have different optical properties such as a wavelength and a polarization direction in such a way that the transmission light and the reception light are separated by the separator 331. When the dichroic mirror is used as the separator 331, one of two wavelengths (for example, 1.53 μm) that can be separated by the dichroic mirror may be a wavelength of transmission light, and the other (for example, 1.56 μm) may be a wavelength of reception light.

Further, when the PBS is used as the separator 331, the transmitter-receiver 21 of the satellite station 2 transmits reception light in a fixed polarization direction, and the PBS is set at an angle at which the reception light goes therethrough. Then, a polarization direction of transmission light is set in such a way that the transmission light is reflected by the PBS. A polarization direction of transmission light incident on the PBS may be fixed by using a polarization plane-preserving fiber in the transmission path 710.

Figure 6:
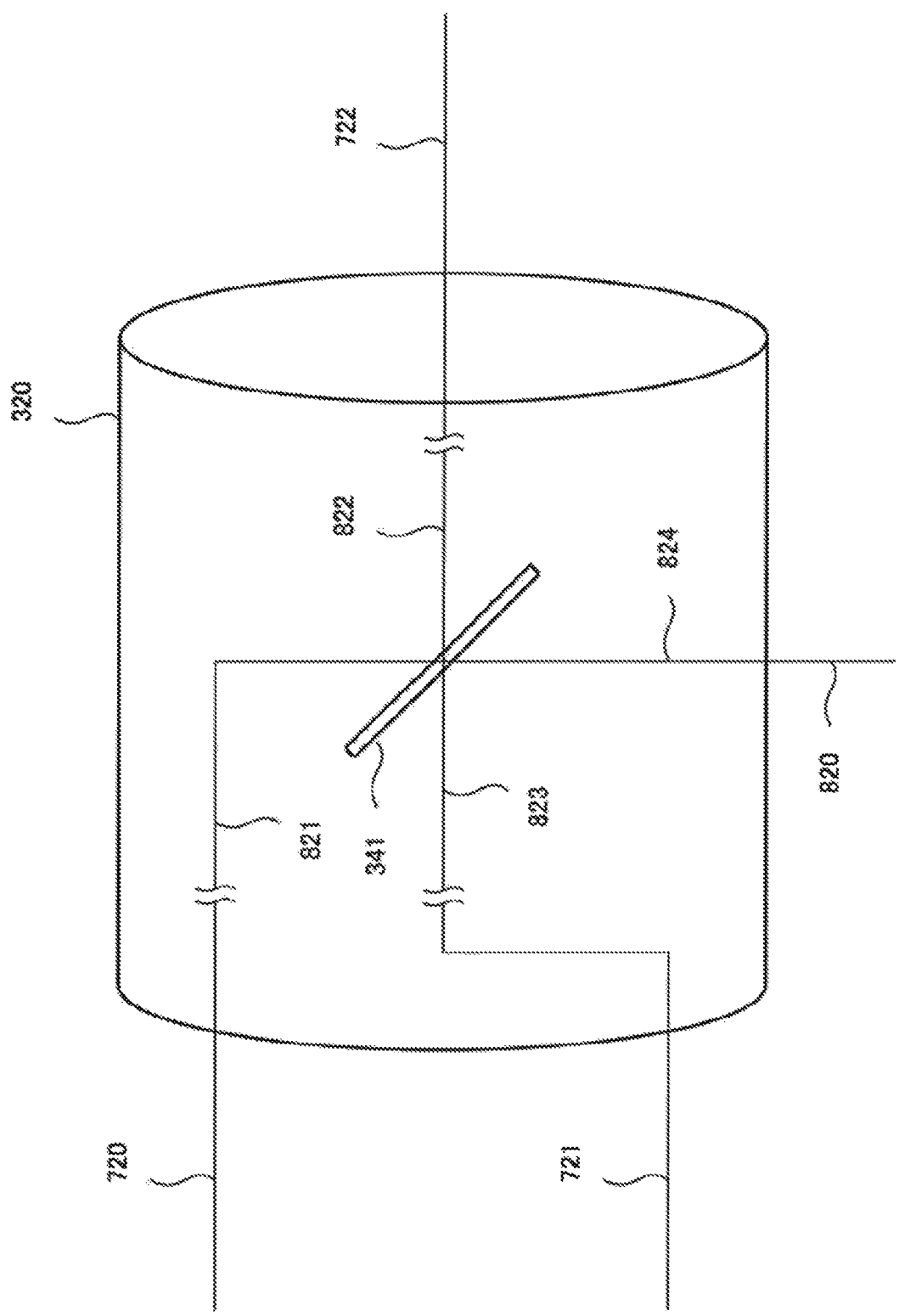
FIG. 6 is a diagram illustrating a connection example of a transmission path between the inside and the outside of an optical antenna 320.

FIG. 6 is a diagram illustrating a connection example of a transmission path between the inside and the outside of the optical antenna 320. A configuration and a function of the optical antenna 320 are similar to those of the optical antenna 310. Only reference signs in FIG. 6 are different from those in FIG. 5.

Figure 7:
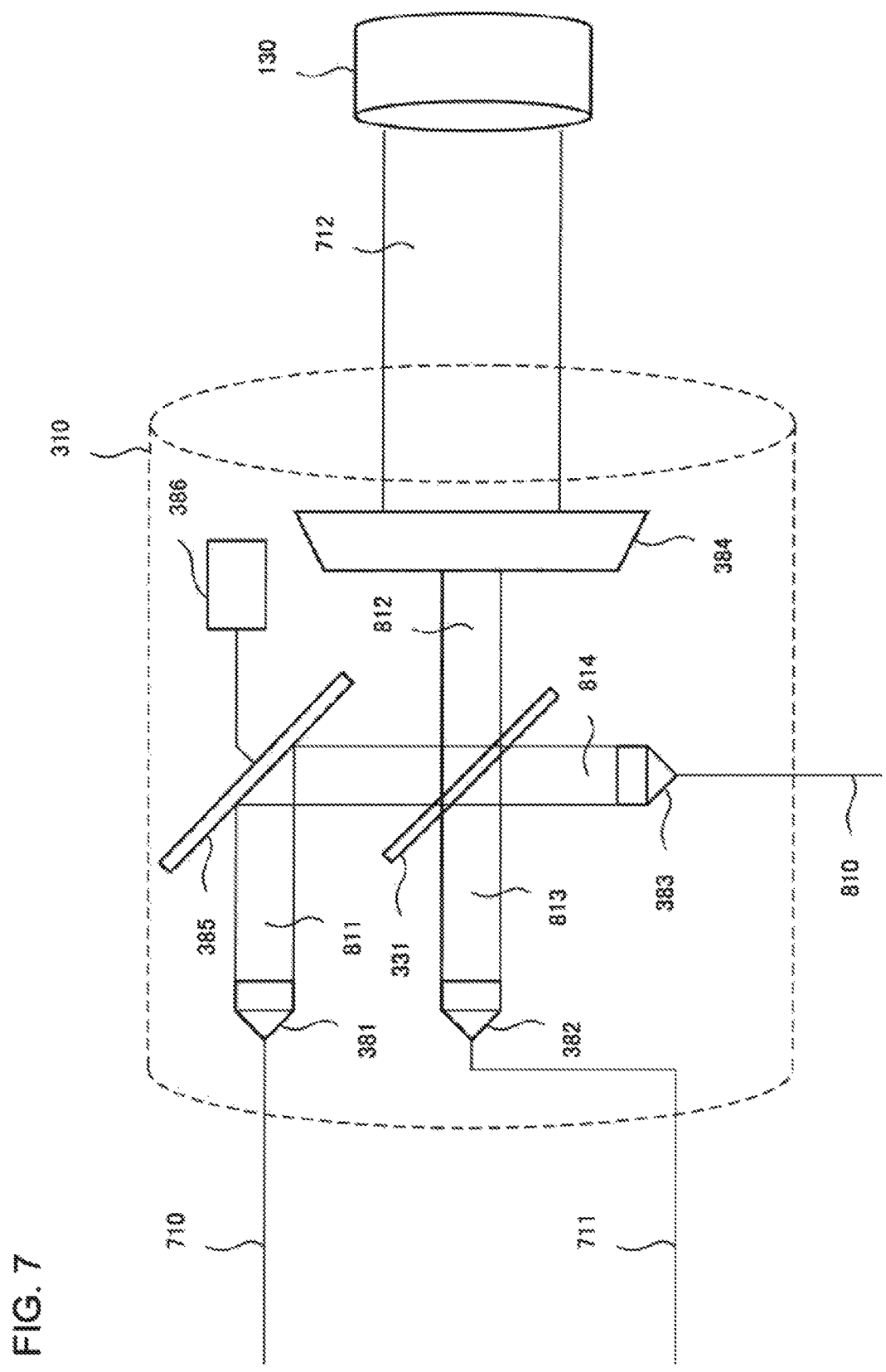
FIG. 7 is a diagram illustrating an example of an internal configuration of the optical antenna 310.

FIG. 7 is a diagram illustrating an example of an internal configuration of the optical antenna 310 illustrated in FIG. 5. The following description is similarly applied to the optical antenna 320 illustrated in FIG. 6. The optical antenna 310 includes the separator 331, collimators 381 to 383, a beam radius converter 384, a mirror 385, and a mirror control circuit 386.

The collimators 381 to 383 couple light propagating through the transmission paths 710, 711, and 810 being the optical fibers and parallel light propagating through the transmission paths 811, 813, and 814 being the space. The collimators 381 to 383 are also referred to as optical fiber collimators. The beam radius converter 384 converts a beam radius of light propagating through the transmission path 712 and a beam radius of light propagating through the transmission path 812. All of the collimators 381 to 383 and the beam radius converter 384 may be constituted by using at least one lens.

The mirror 385 reflects transmission light radiated by the collimator 381 (namely, parallel light propagating through the transmission path 811), and causes the transmission light to be incident on the separator 331. The mirror 385 is able to control a reflection direction of the transmission light by control of the mirror control circuit 386. In other words, the mirror 385 and the mirror control circuit 386 are able to control an incident angle of the transmission light on the separator 331.

Figure 8:
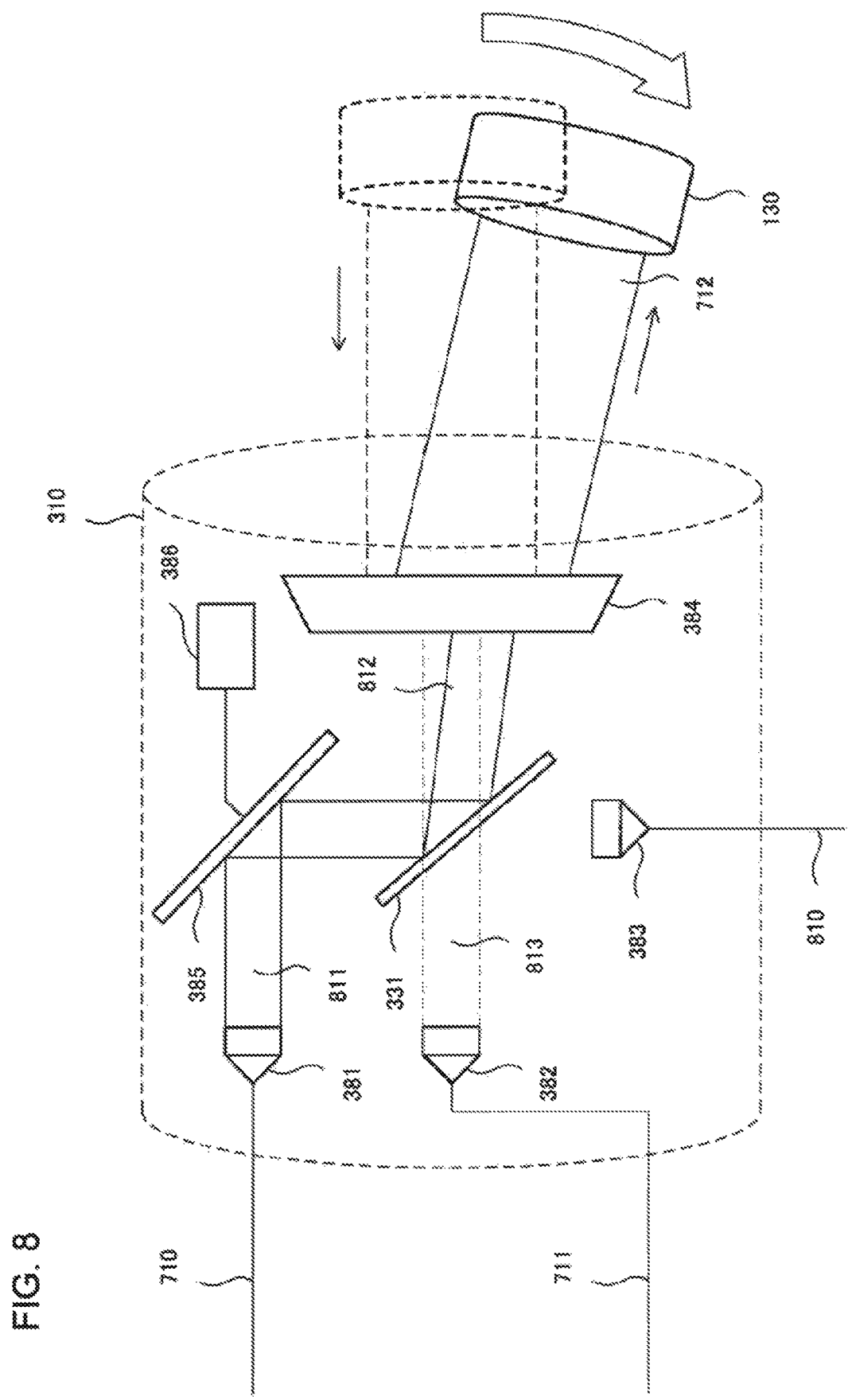
FIG. 8 is a diagram illustrating an example of a transmission direction of transmission light when an angle of a mirror 385 is controlled.

FIG. 8 is a diagram illustrating an example of a transmission direction of transmission light when an angle of the mirror 385 is controlled. An angle at which transmission light is incident on the separator 331 can be changed by controlling an incident angle of the transmission light on the separator 331. In this case, the separator 331 is fixed, and thus reception of reception light is not affected. Therefore, the transmission light can be transmitted to a direction different from a reception direction of the reception light by controlling an angle of the mirror 385.

For example, when the satellite station 2 is moving, a direction in which reception light is received in the optical antenna 310 is different from a direction in which transmission light needs to be transmitted. In other words, the ground station 1B needs to transmit transmission light toward a position of an optical antenna 130 at a point in time when the transmission light is received in the satellite station 2 while taking a positional change in the optical antenna 130 due to the movement of the satellite station 2 into account. In the present example embodiment, a transmission direction of transmission light can be controlled independently of a direction of reception light in such a way that the transmission light is received at a movement destination of the satellite station 2 by controlling an incident angle of the transmission light on the separator 331 by using the mirror 385. The direction of the transmission light can be acquired in the ground station 1B, based on known information about an orbit of a satellite. A configuration of the mirror 385 and a configuration for controlling an angle thereof are not limited. For example, a direction of transmission light propagating through the transmission path 811 may be controlled by using micro electro mechanical systems (MEMS) as the mirror 385. The mirror control circuit 386 may be controlled by a control circuit provided in the receiver 140 or a place of the ground station 1B other than that.

Next, the delay adjustment method according to the present example embodiment is described with reference to FIGS. 5 and 6. In the delay adjustment method according to the present example embodiment, a time difference $\delta 0$ between the transmission paths 710 and 720 and a time difference $\delta 1$ between the transmission paths 711 and 721 are first measured, similarly to FIG. 2. The transmission paths 810 and 820 are used for this measurement as follows.

The time difference $\delta 0$ between the transmission path 710 and the transmission path 720 is obtained by the following procedure. The delay circuits 111 and 121 transmit light passing through the separators 331 and 341, respectively. In other words, when the separators 331 and 341 are dichroic mirrors, the transmitter 110 transmits light having the same wavelength as that of reception light. When the separators 331 and 341 are polarization beam splitters, the delay circuits 111 and 121 transmit light incident on the separators 331 and 341 in the same polarization direction as that of reception light. By measuring each of arrival times at an end portion of the transmission path 810 located outside the optical antenna 310 and at an end portion of the transmission path 820 located outside the optical antenna 320, the time difference $\delta 0$ is obtained from a difference between the arrival times.

On other hand, a difference in arrival time between the transmission path 711 and the transmission path 721 is obtained by the following procedure. Light reflected by the separators 331 and 341 is input from each of the end portions of the transmission paths 810 and 820. In other words, when the separators 331 and 341 are dichroic mirrors, light having the same wavelength as that of transmission light is input from each of the end portions of the transmission paths 810 and 820. When the separators 331 and 341 are polarization beam splitters, light incident on the separators 331 and 341 in the same polarization direction as that of transmission light is input from each of the end portions. The beams of light input from the end portions pass through the transmission path 711 or the transmission path 721, and are received by the receiver 140. By measuring reception times of these beams of light in the receiver 140, the time difference $\delta 1$ is obtained from a difference between the reception times.

A procedure after communication starts between the ground station 1B and the satellite station 2 is similar to that in the first and second example embodiments. In other words, the receiver 140 acquires a time difference $\delta r$ between paths from the transmitter-receiver 21 to the receiver 140, and increases a delay of the delay circuit 113 further than that of the delay circuit 123 by $\delta r$ and also increases a delay of the delay circuit 111 further than that of the delay circuit 121 by $\delta r - \delta 1 + \delta 0$. By setting the delays of the delay circuits 111, 113, 121, and 123 in such a manner, respective reception timings of transmission data and reception data passing through the optical antennas 310 and 320 can coincide with each other.

In the present example embodiment, a measured delay includes a delay of the transmission paths 810 and 814 or the transmission paths 820 and 824 connected to the optical antennas 310 and 320 in addition to a time difference between transmission paths having a delay to be adjusted. In the above-described example, the delay of the path including the transmission paths 720, 821, 824, and 820 is longer than the delay of the path including the transmission paths 710, 811, 814, and 810 by $\delta 0$. Further, the delay of the transmission paths 820, 824, 823, and 721 is longer than the delay of the transmission paths 810, 814, 813, and 711 by $\delta 1$. Then, neither transmission light nor reception light goes through the transmission paths 810 and 814, and the transmission paths 820 and 824 during communication. However, the delays of the transmission paths 810 and 814 and the transmission paths 820 and 824 cancel out each other in the calculation of the delay $\delta r - \delta 1 + \delta 0$, and thus the delays of the transmission paths 810 and 814 and the transmission paths 820 and 824 do not affect a delay set in each delay circuit.

The optical space communication system 300 described above is able to achieve an effect similar to that of the first example embodiment, and can also process transmission light and reception light independently by separating the transmission and reception light in the space optical system. Further, by providing the mirror 385, transmission light can be transmitted to a direction in consideration of movement of the satellite station 2 without affecting reception of reception light.

Fourth Example Embodiment

Figure 9:
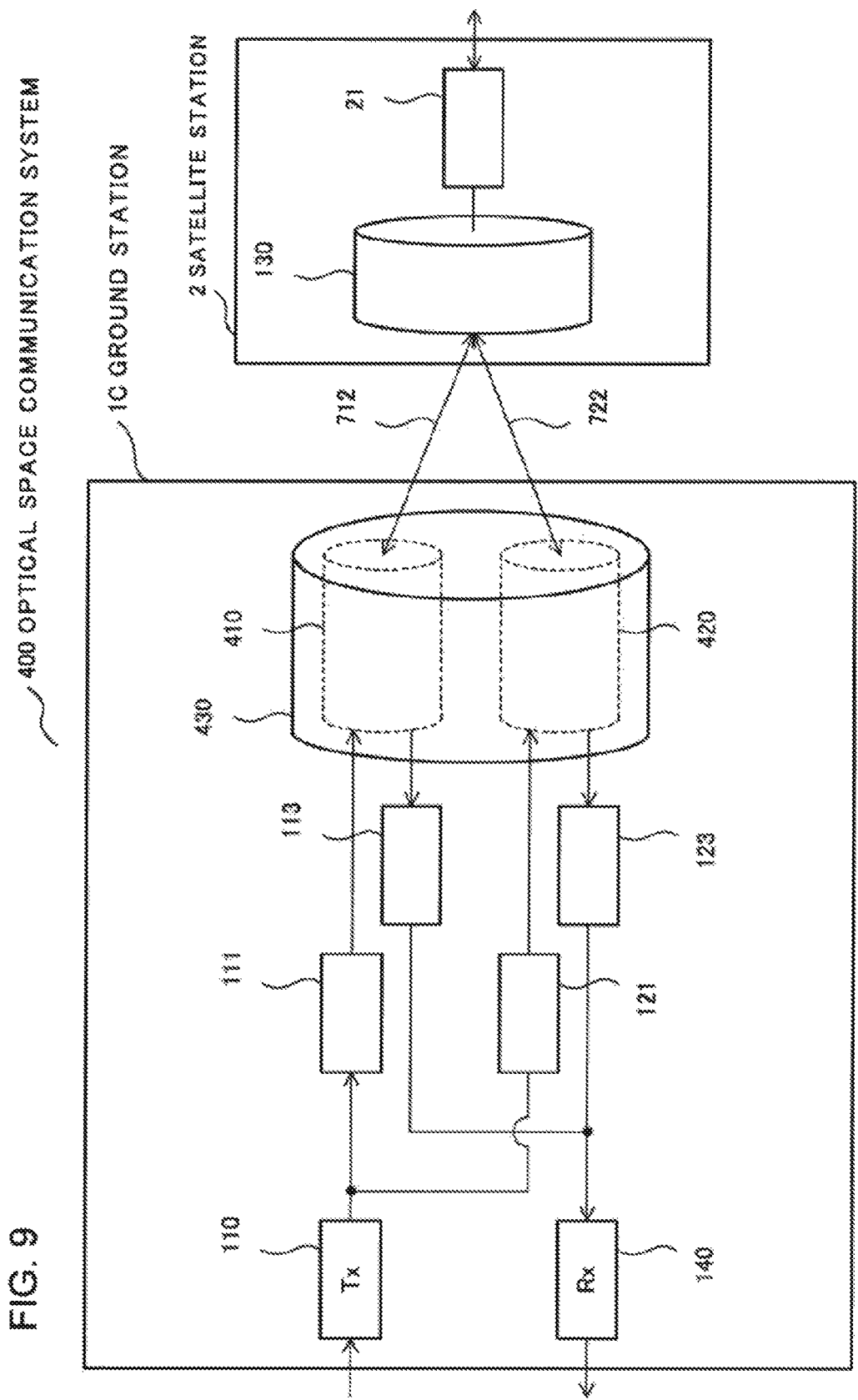
FIG. 9 is a block diagram illustrating a configuration example of an optical space communication system 400 according to a fourth example embodiment.

Next, a fourth example embodiment of the present invention is described. FIG. 9 is a block diagram illustrating a configuration example of an optical space communication system 400 according to a fourth example embodiment. The optical space communication system 400 includes a ground station 1C and a satellite station 2. An optical antenna 410 of the ground station 1C includes transmission paths 710 and 711, an intersection 71, and an optical antenna 112 illustrated in the first example embodiment. Similarly, an optical antenna 420 includes transmission paths 720 and 721, an intersection 72, and an optical antenna 122. A frame 430 holds the optical antennas 410 and 420 together. Further, the ground station 1C includes control lines 911, 912, 921, and 922 similar to those of the ground station 1 in the first example embodiment, but the control lines 911, 912, 921, and 922 are omitted from FIG. 9 in order to avoid a complicated drawing.

Figure 10:
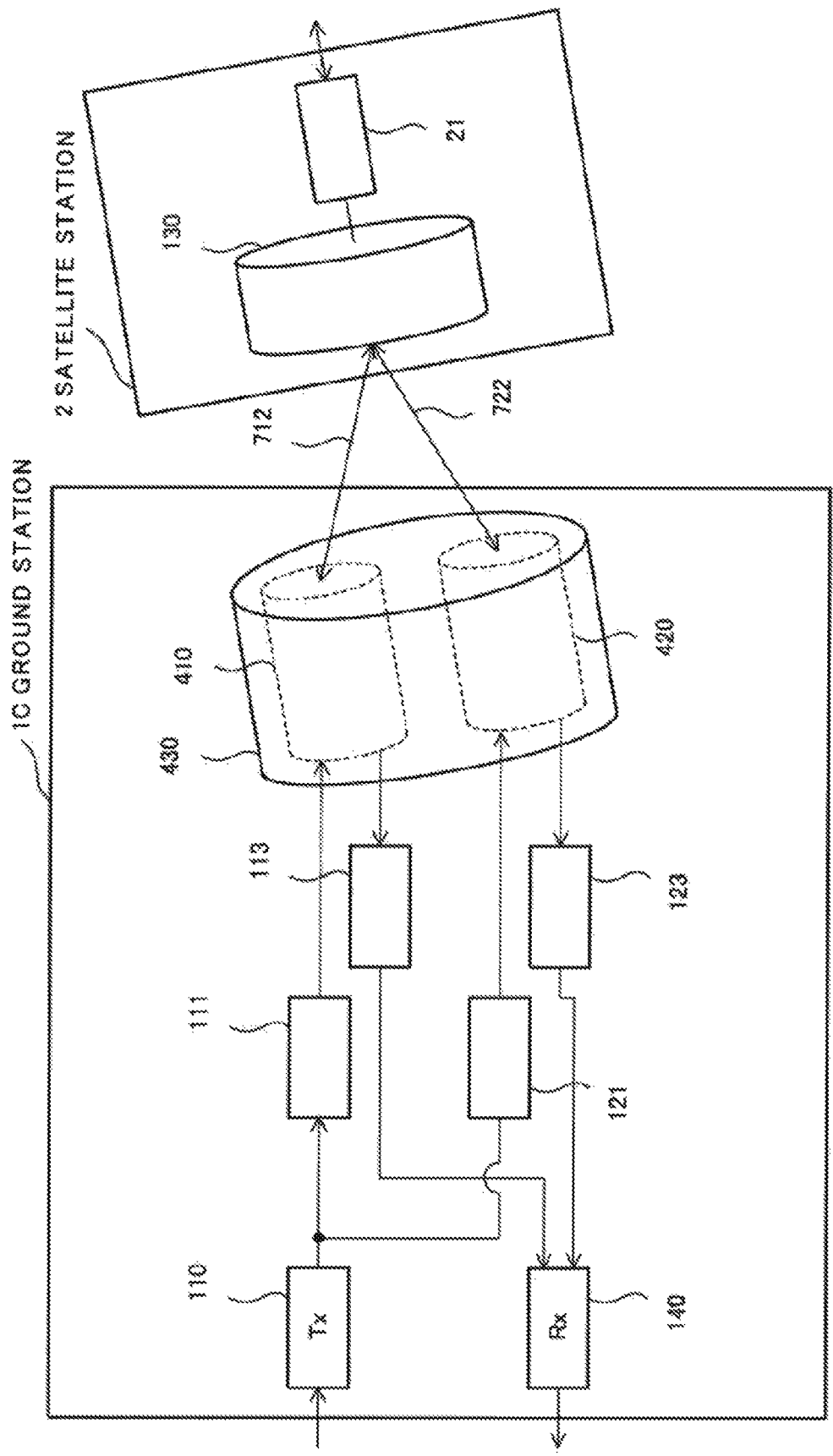
FIG. 10 is a diagram illustrating an example in which directions of optical antennas 410 and 420 is changed.

FIG. 10 is a diagram illustrating an example in which directions of the optical antennas 410 and 420 are changed. Since the two optical antennas 410 and 420 of the ground station 1C are fixed to the frame 430 in the present example embodiment, a difference between a delay of the transmission path 712 and a delay of the transmission path 722 does not change even when relative positions of the ground station 1C and the satellite station 2 change. For example, as illustrated in FIG. 10, even when directions of the optical antennas 410 and 420 are changed due to the movement of the satellite station 2 as compared to that in FIG. 9, a difference in delay time between the transmission paths 712 and 722 does not change. Therefore, the optical space communication system 400 performs the delay adjustment method illustrated in FIG. 2. Further, since a difference in delay time between the transmission paths 712 and 722 does not change, it is not essential to make an adjustment according to a change in positions between the ground station 1C and the satellite station 2 after communication starts. However, when a predetermined period of time has elapsed after the communication starts, or when a delay adjustment is needed, a delay of a delay circuit is adjusted again.

Figure 11:
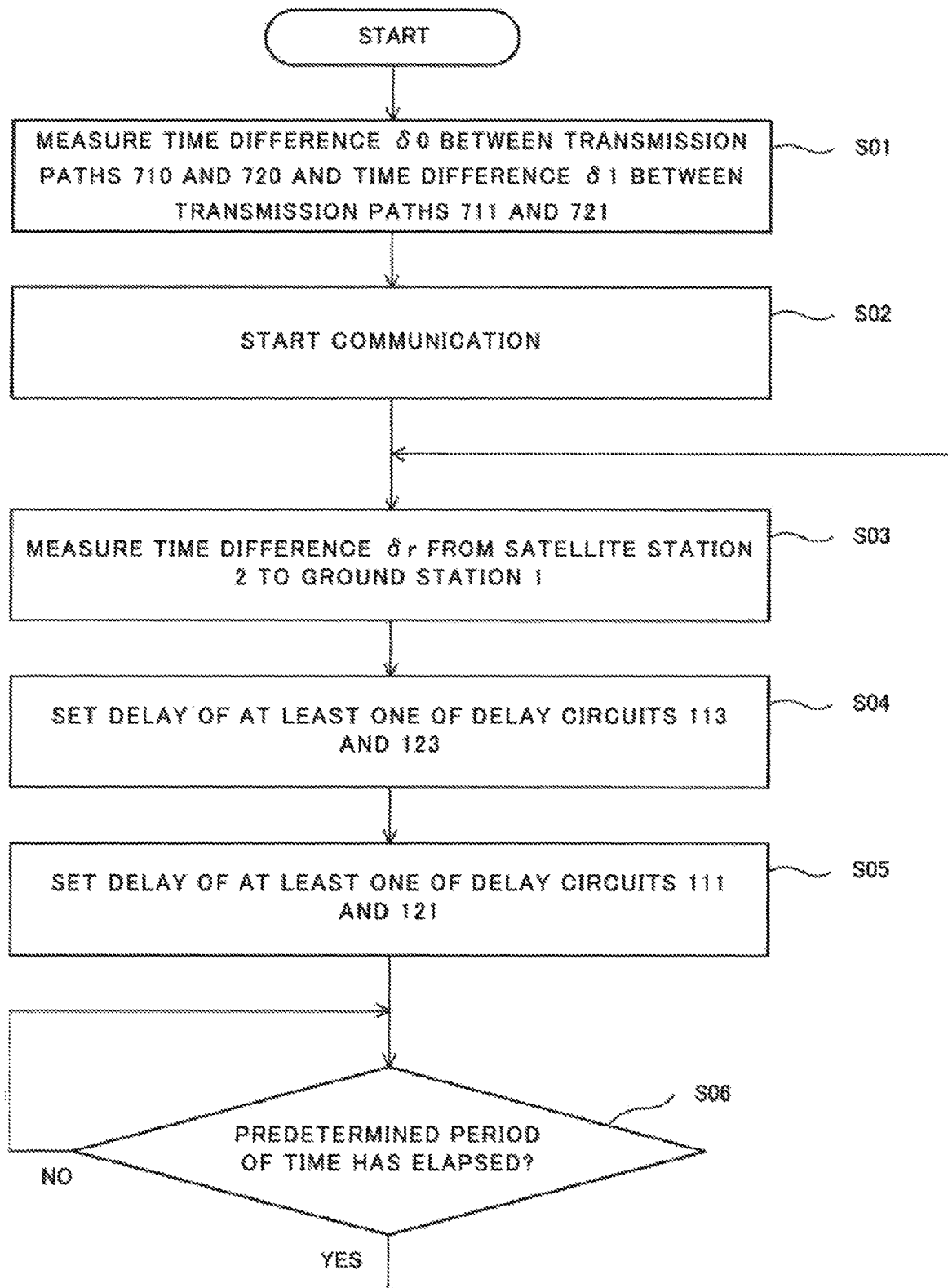
FIG. 11 is a flowchart illustrating an example of a delay adjustment method in the fourth example embodiment.

FIG. 11 is a flowchart illustrating an example of the delay adjustment method according to the fourth example embodiment. FIG. 11 is different from the flowchart in FIG. 2 in that FIG. 11 includes Step S06. When a predetermined period of time has elapsed after communication starts, or when a delay adjustment is needed, a delay of a delay circuit is adjusted again by Step S05.

When a predetermined period of time has elapsed after communication starts, or when a delay adjustment is needed, the optical space communication system 400 having such a configuration adjusts a delay of a delay circuit again by using a procedure similar to that in the first example embodiment. Thus, the optical space communication system 400 can reflect a delay amount of an optical system of a telescope and deal with a change in delay amount during communication.

Fifth Example Embodiment

Figure 12:
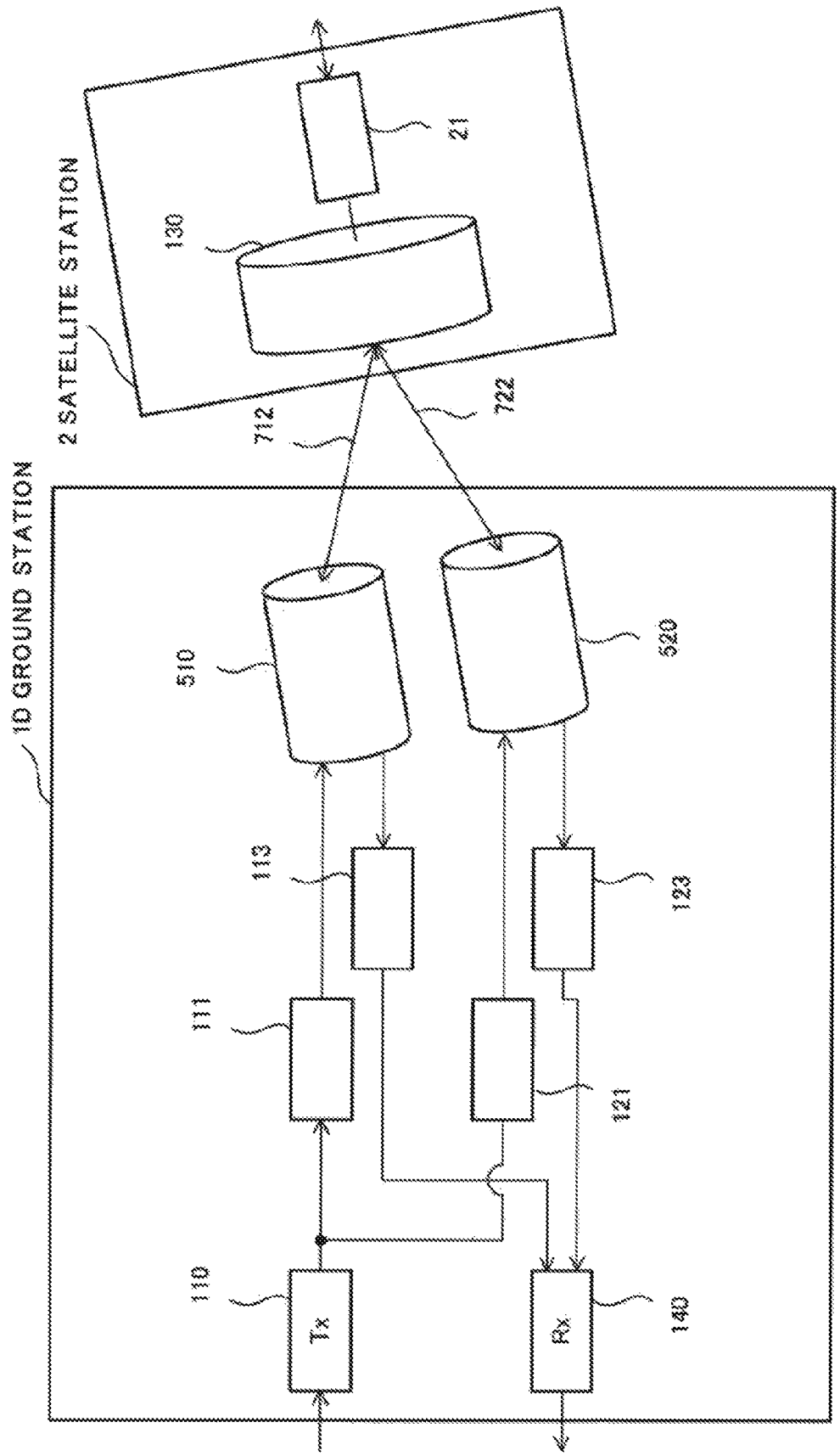
FIG. 12 is a block diagram illustrating a configuration example of an optical space communication system 500 according to a fifth example embodiment.

Next, a fifth example embodiment of the present invention is described. FIG. 12 is a block diagram illustrating a configuration example of an optical space communication system 500 according to the present example embodiment. The optical space communication system 500 includes a ground station 1D and a satellite station 2. The ground station 1D lacks in a frame 430 as compared to the ground station 1C in the fourth example embodiment. Further, the optical antennas 410 and 420 of the ground station 1C are indicated by optical antennas 510 and 520 in the ground station 1D. The optical antennas 510 and 520 are able to independently control a direction to the satellite station 2. The ground station 1D includes control lines 911, 912, 921, and 922 similar to those of the ground station 1 in the first example embodiment, but the control lines 911, 912, 921, and 922 are omitted from FIG. 12.

Figure 13:
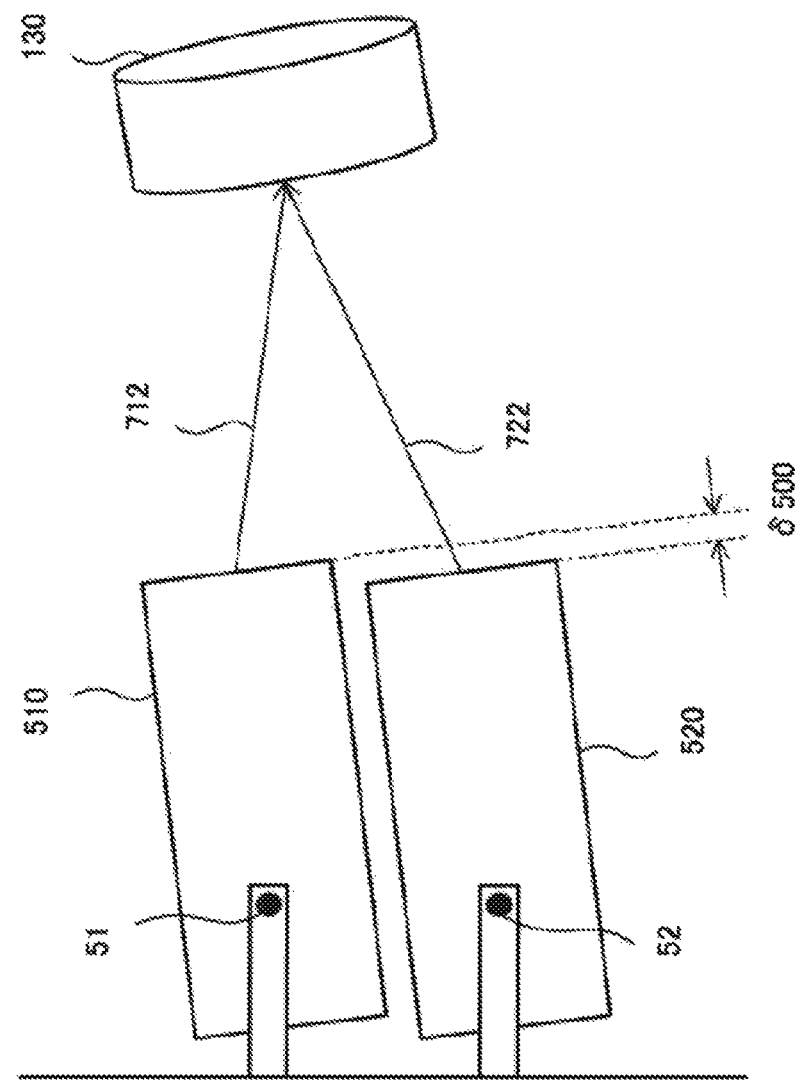
FIG. 13 is a diagram illustrating an example in which optical antennas 510 and 520 rotate.

Next, a delay adjustment method according to the present example embodiment is described. In the present example embodiment, the two optical antennas of the ground station 1D are individually disposed. Thus, a difference between a delay of the transmission path 712 and a delay of the transmission path 722 changes according to a change in relative positions of the ground station 1D and the satellite station 2. FIG. 13 is a diagram illustrating an example in which the optical antenna 510 and the optical antenna 520 rotate about a fulcrum 51 and a fulcrum 52 as axes, respectively, and communicate with the satellite station 2. In this case, a difference (time difference δ500) between a delay of the transmission path 712 and a delay of the transmission path 722 is generated due to the rotation of the optical antennas 510 and 520. The time difference δ500 changes depending on a position of the satellite station 2. A change in δ500 can be measured as a change in δr described in the first example embodiment.

Figure 14:
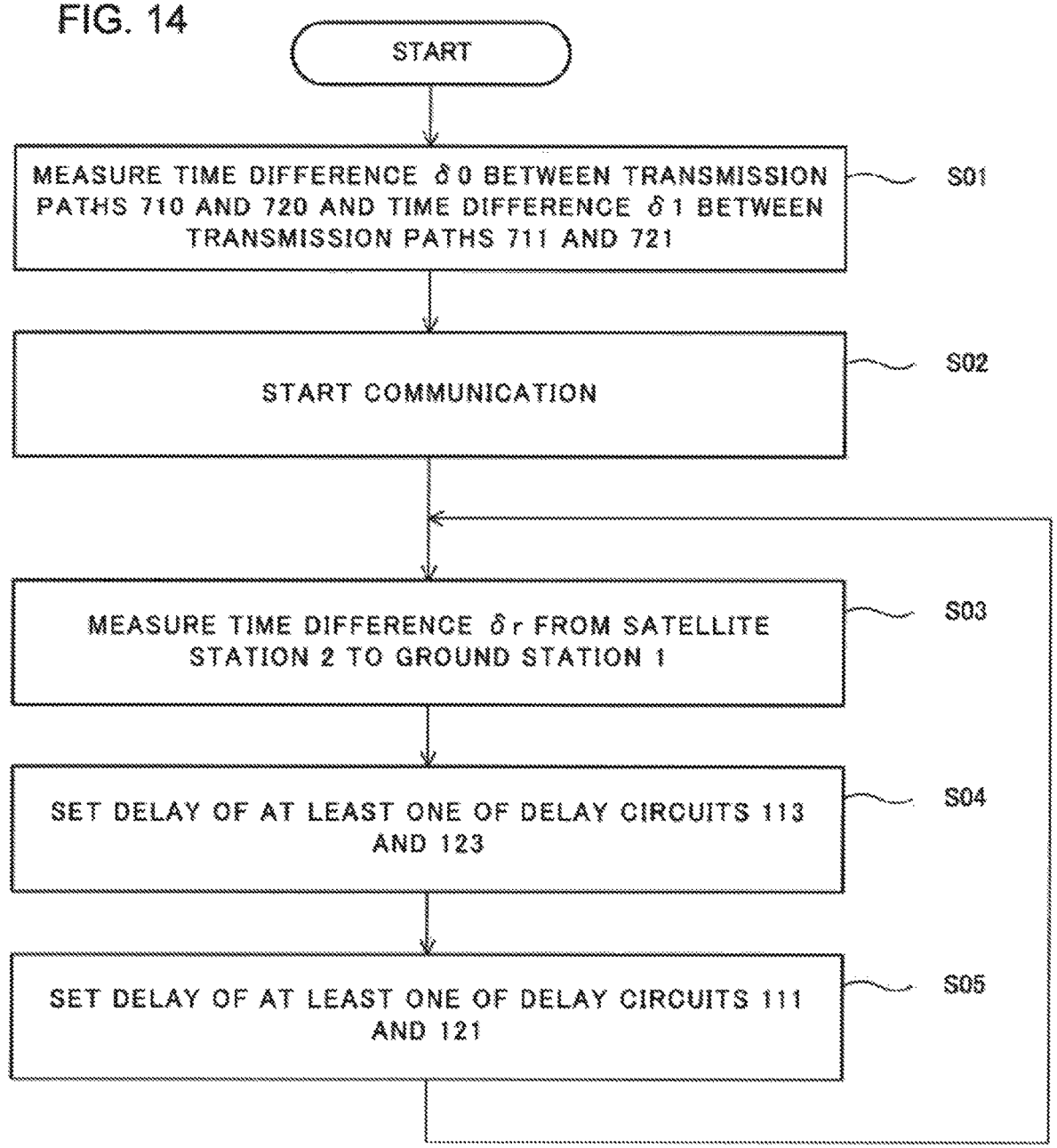
FIG. 14 is a flowchart illustrating an example of a delay adjustment method according to the fifth example embodiment.

FIG. 14 is a flowchart illustrating an example of the delay adjustment method in the fifth example embodiment. Steps S01 to S04 are similar to those in FIG. 2 in the first example embodiment. In FIG. 14, a flow always returning to a measurement of δr after an adjustment of a delay of a delay circuit is added. After execution of Step S05, the processing returns to Step S03 immediately or in a short period of time, and δr is measured again, and thus a delay of the delay circuit can follow positional fluctuations of the satellite station 2.

The optical space communication system 500 performs a measurement of a delay as described above. A measurement period of a delay is arbitrary, and a delay may be periodically measured. As a result, even when a delay between the ground station 1D and the satellite station 2 changes together with time, transmission timing of transmission data and reception timing of reception data can follow a change in delay. In other words, the optical space communication system 500 is able to reflect a delay amount of an optical system of a telescope and deal with a change in delay amount during communication.

In the descriptions of the fourth and fifth example embodiments, the descriptions are made based on the ground station 1 in the first example embodiment. The configurations and the descriptions of the fourth and fifth example embodiments are also applicable to the ground stations 1A and 1B in the second and third example embodiments.

Sixth Example Embodiment

Figure 15:
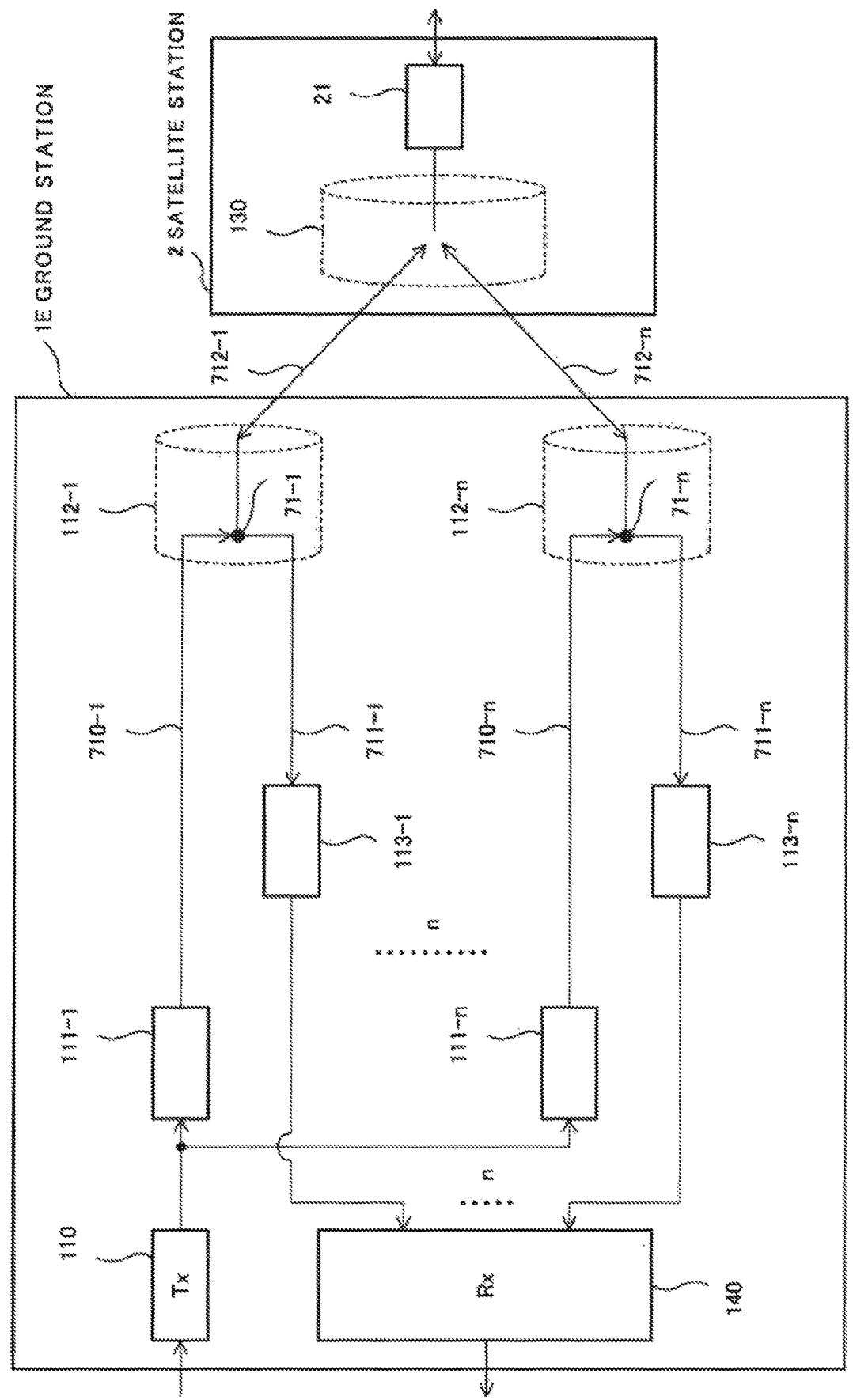
FIG. 15 is a block diagram illustrating a configuration example of an optical space communication system 600 according to a sixth example embodiment.

Next, a sixth example embodiment of the present invention is described. FIG. 15 is a block diagram illustrating a configuration example of an optical space communication system 600 according to a sixth example embodiment. The optical space communication system 600 includes a ground station 1E and a satellite station 2. The ground station 1E includes n optical antennas 112-1 to 112-n. n is an integer equal to or greater than 3. n groups of delay circuits are also prepared to correspond to the n optical antennas. In other words, delay circuits 111-1 and 113-1 are connected to the optical antenna 112-1. Similarly, delay circuits 111-n and 113-n are connected to the optical antenna 112-n.

In the ground station 1 in the first example embodiment, the two optical antennas 112 and 122 are disposed in parallel and are each connected to the transmitter 110 and the receiver 140. In the present example embodiment, the n optical antennas 112-1 to 112-n are connected in parallel and are each connected to a transmitter 110 and a receiver 140. The optical antennas 112-1 to 112-n and the delay circuits 111-1 to 111-n and 113-1 to 113-n have functions similar to those of the optical antenna 112 and the delay circuits 111 and 113, and each communicate with the satellite station 2 via transmission paths 712-1 to 712-n.

The receiver 140 includes control lines for setting a delay between the delay circuits 111-1 to 111-n and 113-1 to 113-n, but description in FIG. 15 is omitted.

Next, a delay adjustment method according to the present example embodiment is described. In the present example embodiment, based on a difference in transmission time relative to one optical antenna being a reference among the optical antennas 112-1 to 112-n of the ground station 1E, delays of delay circuits connected to other n−1 optical antennas are adjusted. For example, when the optical antenna 112-1 is a reference, delays of the delay circuits 111-1 and 113-1 are fixed. Then, time differences δ0, δ1, and δr of each of the transmission paths 710-2 to 710-n and 711-1 to 711-n connected to the optical antennas 112-2 to 112-n are measured similarly to the flowchart in FIG. 2.

Then, delays of the transmission paths connected to the optical antennas 112-1 to 112-n to be used can be adjusted by setting a delay to the delay circuit, based on each of the measured time differences δ0, δ1, and δr.

A delay may be adjusted by using an antenna having the highest reception level as an optical antenna being a reference. In this case, a delay of another delay circuit can be increased or reduced further than a delay of a delay circuit connected to the antenna being the reference by previously providing a delay to each delay circuit element.

In the description of the present example embodiment, a case where two optical antennas of the ground station 1 in the first example embodiment are increased to n is described. It is clear that the similar increase may also be applied to the ground stations 1A to 1D in the second to fifth example embodiments.

The optical space communication system 600 having such a configuration is also able to reflect a delay amount of an optical system of a telescope and deal with a change in delay amount during communication.

Seventh Example Embodiment

The ground stations 1 to 1E described above can also be referred to as optical space communication devices. The optical space communication device in the first example embodiment can also be described as follows. A reference sign in FIG. 1 is denoted in parentheses.

An optical space communication device (1) includes first and second optical antennas (112, 122), first to fourth delay means (111, 121, 113, 123), and a reception means (140).

The first optical antenna (112) transmits first transmission light including transmission data to a communication destination (2), and receives first reception light including reception data from the communication destination (2). The second optical antenna (122) transmits second transmission light including transmission data to the communication destination (2), and receives second reception light including reception data from the communication destination (2).

The first delay means (111) provides a predetermined delay to the transmission data included in the first transmission light. The second delay means (121) provides a predetermined delay to the transmission data included in the second transmission light. The third delay means (113) provides a predetermined delay to the reception data included in the first reception light. The fourth delay means (123) provides a predetermined delay to the reception data included in the second reception light.

The reception means (140) receives the reception data included in the first reception light and the reception data included in the second reception light. The reception means (140) acquires a first time difference being a difference between a first delay amount being a delay between the first delay means and the first optical antenna, and a second delay amount being a delay between the second delay means and the second optical antenna. The reception means (140) acquires a second time difference being a difference between a third delay amount being a delay between the first optical antenna and the third delay means, and a fourth delay amount being a delay between the second optical antenna and the fourth delay means. The reception means (140) acquires a third time difference being a difference between a third delay amount being a delay between the communication destination and the third delay means, and a fourth delay amount being a delay between the communication destination and the fourth delay means.

Then, the reception means (140) sets a delay of at least one of the first delay means and the second delay means in such a way that the transmission data included in the first transmission light and the transmission data included in the second transmission light are received at the communication destination at approximately the same timing, based on the first to third time differences. The reception means (140) sets a delay of at least one of the third delay means and the fourth delay means in such a way that the first and second reception data are received at approximately the same timing, based on the third time difference.

The optical space communication device having such a configuration achieves an effect similar to that in the first example embodiment by setting a delay amount of a delay means by using the procedure in FIG. 2.

In each of the example embodiments described above, the receiver 140 may include a central processing unit (CPU) and a recording device. The CPU may achieve a function of the receiver 140 by executing a program stored in the recording device. The recording device is a fixed recording medium that is not transitory, and is, for example, a semiconductor memory, but is not limited thereto. The CPU and the recording device may be disposed outside the receiver 140. A program executed by the CPU may achieve functions of monitoring and controlling the entire ground stations 1 to 1E including the procedures in FIGS. 2, 11 and 14, and a function of controlling a direction of the optical antennas 112 and 122. The CPU and the recording device including the functions above can be referred to as a control circuit.

The whole or part of the example embodiments disclosed above can be described as, but not limited to, the following supplementary notes.

(Supplementary Note 1)

An optical space communication device including:

a first optical antenna that transmits first transmission light including transmission data to a communication destination, and receives first reception light including reception data from the communication destination;

a second optical antenna that transmits second transmission light including the transmission data to the communication destination, and receives second reception light including the reception data from the communication destination;

a first delay means for providing a predetermined delay to the transmission data included in the first transmission light;

a second delay means for providing a predetermined delay to the transmission data included in the second transmission light;

a third delay means for providing a predetermined delay to the reception data included in the first reception light;

a fourth delay means for providing a predetermined delay to the reception data included in the second reception light; and a reception means for receiving the reception data included in the first reception light and the reception data included in the second reception light, acquiring a first time difference being a difference between a first delay amount being a delay between the first delay means and the first optical antenna and a second delay amount being a delay between the second delay means and the second optical antenna, acquiring a second time difference being a difference between a third delay amount being a delay between the first optical antenna and the third delay means and a fourth delay amount being a delay between the second optical antenna and the fourth delay means, acquiring a third time difference being a difference between a third delay amount being a delay between the communication destination and the third delay means and a fourth delay amount being a delay between the communication destination and the fourth delay means, setting a delay of at least one of the first delay means and the second delay means in such a way that the transmission data included in the first transmission light and the transmission data included in the second transmission light are received at the communication destination at approximately the same timing, based on the first to third time differences, and setting a delay of at least one of the third delay means and the fourth delay means in such a way that all the reception data are received at approximately the same timing, based on the third time difference.

(Supplementary Note 2)

The optical space communication device according to supplementary note 1, wherein when the first time difference is D1, the second time difference is D2, and the third time difference is D3, a delay of the third delay means and a delay of the fourth delay means are set in such a way that a difference between the delay of the fourth delay means and the delay of the third delay means is D3, and a delay of the first delay means and a delay of the second delay means are set in such a way that a difference between the delay of the second delay means and the delay of the first delay means is D3−D2+D1.

(Supplementary Note 3)

The optical space communication device according to supplementary note 1 or 2, further including:

a first optical coupler disposed in such a way as to output the first transmission light input from the first delay means to the first optical antenna, and output the first reception light received by the first optical antenna to the third delay means; and a second optical coupler disposed in such a way as to output the second transmission light input from the second delay means to the second optical antenna, and output the second reception light received by the second optical antenna to the fourth delay means, wherein the first delay means includes a first electric-optic conversion means for providing a predetermined delay to the transmission data input as an electric signal, converting the transmission data provided with the delay into the first transmission light, and outputting the first transmission light to the first optical coupler, the second delay means includes a second electric-optic conversion means for providing a predetermined delay to the transmission data input as an electric signal, converting the transmission data provided with the delay into the second transmission light, and outputting the second transmission light to the second optical coupler, the third delay means includes a first optic-electric conversion means for converting the first reception light input from the first optical coupler into the reception data being an electric signal, provides a predetermined delay to the reception data, and outputs the reception data to the reception means, and the fourth delay means includes a second optic-electric conversion means for converting the second reception light input from the second optical coupler into the reception data being an electric signal, provides a predetermined delay to the reception data, and outputs the reception data to the reception means.

(Supplementary Note 4)

The optical space communication device according to supplementary note 3, wherein the first and second optical couplers are optical circulators, the first optical coupler is connected to the first optical antenna, the first delay means, and the third delay means with an optical fiber, and the second optical coupler is connected to the second optical antenna, the second delay means, and the fourth delay means with an optical fiber.

(Supplementary Note 5)

The optical space communication device according to supplementary note 3, wherein the first delay means outputs the first transmission light having a wavelength different from that of the first reception light, the second delay means outputs the second transmission light having a wavelength different from that of the second reception light, the first optical coupler is a dichroic mirror capable of separating the first transmission light and the first reception light, the second optical coupler is a dichroic mirror capable of separating the second transmission light and the second reception light, the first optical coupler is disposed in such a way that collimated light coupled to an optical fiber collimator connected to each of the first optical antenna, the first delay means, and the third delay means is incident, and separates the first transmission light and the first reception light, and the second optical coupler is disposed in such a way that collimated light coupled to an optical fiber collimator connected to each of the second optical antenna, the second delay means, and the fourth delay means is incident, and separates the second transmission light and the second reception light.

(Supplementary Note 6)

The optical space communication device according to supplementary note 3, wherein the first optical coupler is a polarizing beam splitter (PBS). capable of separating the first transmission light and the first reception light depending on a polarization direction, the second optical coupler is a PBS capable of separating the second transmission light and the second reception light depending on a polarization direction, the first optical coupler is disposed in such a way that collimated light coupled to an optical fiber collimator connected to each of the first optical antenna, the first delay means, and the third delay means is incident, and separates the first transmission light and the first reception light, and the second optical coupler is disposed in such a way that collimated light coupled to an optical fiber collimator connected to each of the second optical antenna, the second delay means, and the fourth delay means is incident, and separates the second transmission light and the second reception light.

(Supplementary Note 7)

The optical space communication device according to supplementary note 5 or 6, further including a reflection mirror that changes an incident angle of the first transmission light on the first optical coupler, wherein the first optical coupler is disposed in such a way as to reflect the first transmission light and transmit the first transmission light to the communication destination.

(Supplementary Note 8)

The optical space communication device according to supplementary note 7, wherein an angle of the reflection mirror controls a direction of the first transmission light transmitted by the first optical antenna in such a way that the communication destination is able to receive the first transmission light.

(Supplementary Note 9)

The optical space communication device according to any one of supplementary notes 1 to 8, wherein relative positions of the first and second optical antennas are fixed.

(Supplementary Note 10)

The optical space communication device according to any one of supplementary notes 1 to 8, wherein a direction of the first optical antenna and a direction of the second optical antennas are controlled independently.

(Supplementary Note 11)

The optical space communication device according to any one of supplementary notes 1 to 10, wherein three or more groups of a configuration similar to a configuration including the first optical antenna, the first delay means, and the second delay means are disposed in parallel.

(Supplementary Note 12)

A delay adjustment method including:

transmitting first transmission light including transmission data from a first optical antenna to a communication destination;

receiving first reception light including reception data from the communication destination in a second optical antenna;

transmitting second transmission light including the transmission data to the communication destination;

receiving second reception light including the reception data from the communication destination;

providing a predetermined delay to the transmission data included in the first transmission light by a first delay means;

providing a predetermined delay to the transmission data included in the second transmission light by a second delay means;

providing a predetermined delay to the reception data included in the first reception light by a third delay means;

providing a predetermined delay to the reception data included in the second reception light by a fourth delay means;

by a receiver, receiving the reception data included in the first reception light and the reception data included in the second reception light;

acquiring a first time difference being a difference between a first delay amount being a delay between the first delay means and the first optical antenna and a second delay amount being a delay between the second delay means and the second optical antenna;

acquiring a second time difference being a difference between a third delay amount being a delay between the first optical antenna and the third delay means and a fourth delay amount being a delay between the second optical antenna and the fourth delay means;

acquiring a third time difference being a difference between a third delay amount being a delay between the communication destination and the third delay means and a fourth delay amount being a delay between the communication destination and the fourth delay means;

setting a delay of at least one of the first delay means and the second delay means in such a way that the transmission data included in the first transmission light and the transmission data included in the second transmission light are received at the communication destination at approximately the same timing, based on the first to third time differences; and setting a delay of at least one of the third delay means and the fourth delay means in such a way that all the reception data are received at approximately the same timing, based on the third time difference.

(Supplementary Note 13)

The delay adjustment method according to supplementary note 12, further including acquiring the first to third time differences again when a predetermined period of time has elapsed after setting a delay of any of the first to fourth delay means, and setting a delay of any of the first to fourth delay means.

(Supplementary Note 14)

The delay adjustment method according to supplementary note 12 or 13, further including acquiring the first to third time differences again when a direction of at least one of the first and second optical antennas is changed, and setting a delay of any of the first to fourth delay means.

(Supplementary Note 15)

A delay adjustment program causing a computer of an optical space communication device to execute:

a procedure for transmitting first transmission light including transmission data to a communication destination from a first optical antenna;

a procedure for receiving first reception light including reception data from the communication destination in a second optical antenna;

a procedure for transmitting second transmission light including the transmission data to the communication destination;

a procedure for receiving second reception light including the reception data from the communication destination;

a procedure for providing a predetermined delay to the transmission data included in the first transmission light by a first delay means;

a procedure for providing a predetermined delay to the transmission data included in the second transmission light by a second delay means;

a procedure for providing a predetermined delay to the reception data included in the first reception light by a third delay means;

a procedure for providing a predetermined delay to the reception data included in the second reception light by a fourth delay means;

by a receiver, a procedure for receiving the reception data included in the first reception light and the reception data included in the second reception light;

a procedure for acquiring a first time difference being a difference between a first delay amount being a delay between the first delay means and the first optical antenna and a second delay amount being a delay between the second delay means and the second optical antenna;

a procedure for acquiring a second time difference being a difference between a third delay amount being a delay between the first optical antenna and the third delay means and a fourth delay amount being a delay between the second optical antenna and the fourth delay means;

a procedure for acquiring a third time difference being a difference between a third delay amount being a delay between the communication destination and the third delay means and a fourth delay amount being a delay between the communication destination and the fourth delay means;

a procedure for setting a delay of at least one of the first delay means and the second delay means in such a way that the transmission data included in the first transmission light and the transmission data included in the second transmission light are received at the communication destination at approximately the same timing, based on the first to third time differences; and a procedure for setting a delay of at least one of the third delay means and the fourth delay means in such a way that all the reception data are received at approximately the same timing, based on the third time difference.

(Supplementary Note 16)

An optical space communication system, wherein the optical space communication device according to any one of supplementary notes 1 to 11 and a communication destination device being a communication destination that performs optical space communication with the optical communication device are disposed facing each other.

The present invention has been described above with reference to the example embodiments. However, the present invention is not limited to the above-described example embodiments. Various modifications that can be understood by those skilled in the art within the scope of the present invention may be applied to the configuration and the details of the present invention. This application is based upon and claims the benefit of priority from Japanese Patent Application No. 2016-240898, filed on Dec. 13, 2016, the disclosure of which is incorporated herein in its entirety by reference.

REFERENCE SIGNS LIST 1, 1A, 1B, 1C, 1D, 1E Ground station
2 Satellite station
21 Transmitter-receiver
51 Fulcrum
71, 72 Intersection
71A, 72A Circulator
100, 200, 300, 400, 500, 600 Optical space communication system
110 Transmitter
111, 111-1 to 111-$n$, 113, 121, 123 Delay circuit
112, 112-1 to 112-$n$, 122, 130 Optical antenna
140 Receiver
310, 320, 410, 420, 510, 520 Optical antenna
331 Separator
381 to 383 Collimator
384 Beam radius converter
385 Mirror
386 Mirror control circuit
430 Frame
710, 710-2, 711, 712, 712-1 Transmission path
720, 721, 722, 750, 760 Transmission path
810, 811, 812, 813, 814 Transmission path
820, 821, 823, 824 Transmission path
911, 912, 921, 922 Control line

What is claimed is:

1. An optical space communication device comprising:
a first optical antenna that transmits first transmission light including transmission data to a communication destination, and receives first reception light including reception data from the communication destination;
a second optical antenna that transmits second transmission light including the transmission data to the communication destination, and receives second reception light including the reception data from the communication destination;
a first delay circuit configured to provide a predetermined delay to the transmission data included in the first transmission light;
a second delay circuit configured to provide a predetermined delay to the transmission data included in the second transmission light;
a third delay circuit configured to provide a predetermined delay to the reception data included in the first reception light;
a fourth delay circuit configured to provide a predetermined delay to the reception data included in the second reception light; and
a receiver configured to
receive the reception data included in the first reception light and the reception data included in the second reception light,
acquire a first time difference (D1) being a difference between a first delay amount, being a delay of the transmission data transmitted between the first delay circuit and the first optical antenna, and a second delay amount, being a delay of the transmission data transmitted between the second delay circuit and the second optical antenna,
acquire a second time difference (D2) being a difference between a third delay amount, being a delay of the reception data transmitted between the first optical antenna and the third delay circuit, and a fourth delay amount, being a delay of the reception data transmitted between the second optical antenna and the fourth delay circuit,
acquire a third time difference (D3) being a difference between a fifth delay amount, being a delay of the reception data transmitted between the communication destination and the third delay circuit, and a sixth delay amount, being a delay of the reception data transmitted between the communication destination and the fourth delay circuit,
set a delay of at least one of the first delay circuit and the second delay circuit in such a way that the transmission data included in the first transmission light and the transmission data included in the second transmission light are received at the communication destination at substantially the same timing, based on the first to third time differences, and
set a delay of at least one of the third delay circuit and the fourth delay circuit in such a way that the reception data included in the first reception light and the second reception light are received at substantially the same timing, based on the third time difference.

2. The optical space communication device according to claim 1, wherein,
a delay of the third delay circuit and a delay of the fourth delay circuit are set in such a way that a difference between the delay of the fourth delay circuit and the delay of the third delay circuit is D3, and
a delay of the first delay circuit and a delay of the second delay circuit are set in such a way that a difference between the delay of the second delay circuit and the delay of the first delay circuit is D3−D2+D1.

3. The optical space communication device according to claim 1, further comprising:
a first optical coupler disposed in such a way as to output the first transmission light input from the first delay circuit to the first optical antenna, and output the first reception light received by the first optical antenna to the third delay circuit; and a second optical coupler disposed in such a way as to output the second transmission light input from the second delay circuit to the second optical antenna, and output the second reception light received by the second optical antenna to the fourth delay circuit, wherein the first delay circuit includes a first electric-optic converter configured to provide a predetermined delay to the transmission data input as an electric signal, convert the transmission data provided with the delay into the first transmission light, and output the first transmission light to the first optical coupler, the second delay circuit includes a second electric-optic converter configured to provide a predetermined delay to the transmission data input as an electric signal, convert the transmission data provided with the delay into the second transmission light, and output the second transmission light to the second optical coupler, the third delay circuit includes a first optic-electric converter configured to convert the first reception light input from the first optical coupler into the reception data being an electric signal, provides a predetermined delay to the reception data, and outputs the reception data to the receiver, and the fourth delay circuit includes a second optic-electric converter configured to convert the second reception light input from the second optical coupler into the reception data being an electric signal, provides a predetermined delay to the reception data, and outputs the reception data to the receiver.

4. The optical space communication device according to claim 3, wherein
the first optical coupler and the second optical coupler are optical circulators,
the first optical coupler is connected to the first optical antenna, the first delay circuit, and the third delay circuit with an optical fiber, and
the second optical coupler is connected to the second optical antenna, the second delay circuit, and the fourth delay circuit with an optical fiber.

5. The optical space communication device according to claim 3, wherein
the first delay circuit outputs the first transmission light having a wavelength different from that of the first reception light,
the second delay circuit outputs the second transmission light having a wavelength different from that of the second reception light,
the first optical coupler is a dichroic mirror being capable of separating the first transmission light and the first reception light,
the second optical coupler is a dichroic mirror being capable of separating the second transmission light and the second reception light,
the first optical coupler is disposed in such a way that collimated light coupled to an optical fiber collimator connected to each of the first optical antenna, the first delay circuit, and the third delay circuit is incident, and separates the first transmission light and the first reception light, and
the second optical coupler is disposed in such a way that collimated light coupled to an optical fiber collimator connected to each of the second optical antenna, the second delay circuit, and the fourth delay circuit is incident, and separates the second transmission light and the second reception light.

6. The optical space communication device according to claim 3, wherein
the first optical coupler is a polarizing beam splitter (PBS) being capable of separating the first transmission light and the first reception light depending on a polarization direction,
the second optical coupler is a PBS being capable of separating the second transmission light and the second reception light depending on a polarization direction,
the first optical coupler is disposed in such a way that collimated light coupled to an optical fiber collimator connected to each of the first optical antenna, the first delay circuit, and the third delay circuit is incident, and separates the first transmission light and the first reception light, and
the second optical coupler is disposed in such a way that collimated light coupled to an optical fiber collimator connected to each of the second optical antenna, the second delay circuit, and the fourth delay circuit is incident, and separates the second transmission light and the second reception light.

7. The optical space communication device according claim 5, further comprising:
a reflection mirror that changes an incident angle of the first transmission light on the first optical coupler, wherein
the first optical coupler is disposed in such a way as to reflect the first transmission light and transmit the first transmission light to the communication destination.

8. The optical space communication device according to claim 7, wherein
an angle of the reflection mirror controls a direction of the first transmission light transmitted by the first optical antenna in such a way that the communication destination is able to receive the first transmission light.

9. The optical space communication device according to claim 1, wherein relative positions of the first and second optical antennas are fixed.

10. The optical space communication device according to claim 1, wherein a direction of the first optical antenna and a direction of the second optical antenna are controlled independently.

11. The optical space communication device according to claim 1, wherein three or more groups of a configuration including the first optical antenna, the first delay circuit, and the second delay circuit are disposed in parallel.

12. A delay adjustment method comprising:
transmitting first transmission light including transmission data from a first optical antenna to a communication destination;
receiving first reception light including reception data from the communication destination in a second optical antenna;
transmitting second transmission light including the transmission data to the communication destination;
receiving second reception light including the reception data from the communication destination;
providing a predetermined delay to the transmission data included in the first transmission light, by a first delay circuit;
providing a predetermined delay to the transmission data included in the second transmission light, by a second delay circuit;
providing a predetermined delay to the reception data included in the first reception light, by a third delay circuit;
providing a predetermined delay to the reception data included in the second reception light, by a fourth delay circuit;

by a receiver, receiving the reception data included in the first reception light and the reception data included in the second reception light;

acquiring a first time difference being a difference between a first delay amount being a delay of the transmission data transmitted between the first delay circuit and the first optical antenna, and a second delay amount, being a delay of the transmission data transmitted between the second delay circuit and the second optical antenna;

acquiring a second time difference being a difference between a third delay amount being a delay of the reception data transmitted between the first optical antenna and the third delay circuit, and a fourth delay amount, being a delay of the reception data transmitted between the second optical antenna and the fourth delay circuit;

acquiring a third time difference being a difference between a fifth delay amount, being a delay of the reception data transmitted between the communication destination and the third delay circuit, and a sixth delay amount, being a delay of the reception data transmitted between the communication destination and the fourth delay circuit;

setting a delay of at least one of the first delay circuit and the second delay circuit in such a way that the transmission data included in the first transmission light and the transmission data included in the second transmission light are received at the communication destination at substantially the same timing, based on the first to third time differences; and setting a delay of at least one of the third delay circuit and the fourth delay circuit in such a way that the reception data included in the first reception light and the second reception light are received at substantially the same timing, based on the third time difference.

13. The delay adjustment method according to claim 12, further comprising acquiring the first to third time differences again when a predetermined period of time has elapsed after setting a delay of any of the first to fourth delay circuit, and setting a delay of any of the first to fourth delay circuit.

14. The delay adjustment method according to claim 12, further comprising acquiring the first to third time differences again when a direction of at least one of the first and second optical antennas is changed, and setting a delay of any of the first to fourth delay circuit.

15. A non-transitory recording medium of a delay adjustment program causing a computer of an optical space communication device to execute:

a procedure for transmitting first transmission light including transmission data to a communication destination from a first optical antenna;

a procedure for receiving first reception light including reception data from the communication destination in a second optical antenna;

a procedure for transmitting second transmission light including the transmission data to the communication destination;

a procedure for receiving second reception light including the reception data from the communication destination;

a procedure for providing a predetermined delay to the transmission data included in the first transmission light, by a first delay circuit;

a procedure for providing a predetermined delay to the transmission data included in the second transmission light, by a second delay circuit;

a procedure for providing a predetermined delay to the reception data included in the first reception light, by a third delay circuit;

a procedure for providing a predetermined delay to the reception data included in the second reception light, by a fourth delay circuit;

by a receiver, a procedure for receiving the reception data included in the first reception light and the reception data included in the second reception light;

a procedure for acquiring a first time difference being a difference between a first delay amount, being a delay of the transmission data transmitted between the first delay circuit and the first optical antenna, and a second delay amount being a delay of the transmission data transmitted between the second delay circuit and the second optical antenna;

a procedure for acquiring a second time difference being a difference between a third delay amount, being a delay of the reception data transmitted between the first optical antenna and the third delay circuit, and a fourth delay amount, being a delay of the reception data transmitted between the second optical antenna and the fourth delay circuit;

a procedure for acquiring a third time difference being a difference between a fifth delay amount, being a delay of the reception data transmitted between the communication destination and the third delay circuit, and a sixth delay amount, being a delay of the reception data transmitted between the communication destination and the fourth delay circuit;

a procedure for setting a delay of at least one of the first delay circuit and the second delay circuit in such a way that the transmission data included in the first transmission light and the transmission data included in the second transmission light are received at the communication destination at substantially the same timing, based on the first to third time differences; and a procedure for setting a delay of at least one of the third delay circuit and the fourth delay circuit in such a way that the reception data included in the first reception light and the second reception light are received at substantially the same timing, based on the third time difference.

16. An optical space communication system, wherein the optical space communication device according to claim 1 and a communication destination device being the communication destination that performs optical space communication with the optical communication device are disposed in such a way as to face each other.

17. The optical space communication device according to claim 2, further comprising:

a first optical coupler disposed in such a way as to output the first transmission light input from the first delay circuit to the first optical antenna, and output the first reception light received by the first optical antenna to the third delay circuit; and a second optical coupler disposed in such a way as to output the second transmission light input from the second delay circuit to the second optical antenna, and output the second reception light received by the second optical antenna to the fourth delay circuit, wherein the first delay circuit includes a first electric-optic converter configured to provide a predetermined delay to the transmission data input as an electric signal, convert the transmission data provided with the delay into the first transmission light, and output the first transmission light to the first optical coupler, the second delay circuit includes a second electric-optic converter configured to provide a predetermined delay to the transmission data input as an electric signal, convert the transmission data provided with the delay into the second transmission light, and output the second transmission light to the second optical coupler, the third delay circuit includes a first optic-electric converter configured to convert the first reception light input from the first optical coupler into the reception data being an electric signal, provides a predetermined delay to the reception data, and outputs the reception data to the receiver, and the fourth delay circuit includes a second optic-electric converter configured to convert the second reception light input from the second optical coupler into the reception data being an electric signal, provides a predetermined delay to the reception data, and outputs the reception data to the receiver.

18. The optical space communication device according to claim 2, wherein relative positions of the first and second optical antennas are fixed.

19. The optical space communication device according to claim 2, wherein a direction of the first optical antenna and a direction of the second optical antenna are controlled independently.

20. The optical space communication device according to claim 2, wherein three or more groups of a configuration including the first optical antenna, the first delay circuit, and the second delay circuit are disposed in parallel.

* * * * *